(12) United States Patent
Melrose

(10) Patent No.: US 10,351,325 B2
(45) Date of Patent: *Jul. 16, 2019

(54) CONTAINER STRUCTURE FOR REMOVAL OF VACUUM PRESSURE

(71) Applicant: CO2 PAC LIMITED, Auckland (NZ)

(72) Inventor: David Murray Melrose, Auckland (NZ)

(73) Assignee: CO2 PAC LIMITED, Auckland (NZ)

( * ) Notice: Subject to any disclaimer, the term of this patent is extended or adjusted under 35 U.S.C. 154(b) by 885 days.

This patent is subject to a terminal disclaimer.

(21) Appl. No.: 14/187,227

(22) Filed: Feb. 22, 2014

(65) Prior Publication Data

US 2014/0165504 A1   Jun. 19, 2014

Related U.S. Application Data

(63) Continuation of application No. 13/442,846, filed on Apr. 9, 2012, now Pat. No. 9,211,968, which is a
(Continued)

(30) Foreign Application Priority Data

Sep. 30, 2002   (NZ) ........................................ 521694

(51) Int. Cl.
  *B65D 79/00*   (2006.01)
  *B65D 1/02*   (2006.01)
  (Continued)

(52) U.S. Cl.
  CPC .............. *B65D 79/005* (2013.01); *B65B 3/04* (2013.01); *B65D 1/0261* (2013.01);
  (Continued)

(58) Field of Classification Search
  CPC .. B65D 79/005; B65D 1/0261; B65D 1/0276; B65D 79/00; B65B 3/04; B65B 61/24; B67C 2003/226
  (Continued)

(56) References Cited

U.S. PATENT DOCUMENTS

| 1,499,239 A | 6/1924 | Malmquist |
| D110,624 S | 7/1938 | Mekeel, Jr. |

(Continued)

FOREIGN PATENT DOCUMENTS

| AU | 2002257159 | 4/2003 |
| CA | 2077717 | 3/1993 |

(Continued)

OTHER PUBLICATIONS

ISR for PCT/US 2004/024581 dated Jul. 25, 2005.
(Continued)

*Primary Examiner* — Sameh Tawfik
(74) *Attorney, Agent, or Firm* — Henricks Slavin LLP

(57) ABSTRACT

A hot-fill PET container or bottle filling with a liquid at an elevated temperature has a side wall extending to a lower portion including a pressure panel and a base in its unfolded or pre-fill position. The panel is transversely oriented and has a decoupling or hinge structure, an initiator portion and control portion of a steeply angled inverting conical section between 30 and 45 degrees. The control portion enables the inversion of the panel into the container to compensate for vacuum or reduced pressure induced within the container as the liquid cools down. The base can also have a plurality of reinforcing ribs.

17 Claims, 19 Drawing Sheets

Related U.S. Application Data continuation of application No. 10/529,198, filed as application No. PCT/NZ03/00220 on Sep. 30, 2003, now Pat. No. 8,152,010.

(51) Int. Cl.
  *B65B 3/04* (2006.01)
  *B65B 61/24* (2006.01)
  *B67C 3/22* (2006.01)

(52) U.S. Cl.
  CPC ........... *B65D 1/0276* (2013.01); *B65D 79/00* (2013.01); *B65B 61/24* (2013.01); *B67C 2003/226* (2013.01)

(58) Field of Classification Search
  USPC .......................................................... 53/428
  See application file for complete search history.

(56) References Cited

U.S. PATENT DOCUMENTS

| | | | |
|---|---|---|---|
| 2,124,959 A | 7/1938 | Vogel | |
| 2,378,324 A | 6/1945 | Ray et al. | |
| 2,880,902 A | 4/1959 | Owsen | |
| 2,960,248 A | 11/1960 | Kuhlman | |
| 2,971,671 A | 2/1961 | Shakman | |
| 2,982,440 A | 5/1961 | Harrison | |
| 3,043,461 A | 7/1962 | Glassco | |
| 3,081,002 A | 3/1963 | Tauschinski et al. | |
| 3,174,655 A | 3/1965 | Hurschman | |
| 3,301,293 A | 1/1967 | Santelli | |
| 3,325,031 A | 6/1967 | Singier | |
| 3,397,724 A | 8/1968 | Bolen et al. | |
| 3,409,167 A | 11/1968 | Blanchard | |
| 3,426,939 A | 2/1969 | Young | |
| 3,468,443 A | 9/1969 | Marcus | |
| 3,483,908 A | 12/1969 | Donovan | |
| 3,485,355 A | 12/1969 | Stewart | |
| 3,693,828 A | 9/1972 | Kneusel et al. | |
| 3,704,140 A | 11/1972 | Petit et al. | |
| 3,727,783 A | 4/1973 | Carmichael | |
| 3,819,789 A | 6/1974 | Parker | |
| 3,883,033 A | 5/1975 | Brown | |
| 3,904,069 A | 9/1975 | Toukmanian | |
| 3,918,920 A | 11/1975 | Barber | |
| 3,935,955 A | 2/1976 | Das | |
| 3,941,237 A | 3/1976 | Macgregor, Jr. | |
| 3,942,673 A | 3/1976 | Lyu et al. | |
| 3,949,033 A | 4/1976 | Uhlig | |
| 3,956,441 A | 5/1976 | Uhlig | |
| 4,036,926 A | 7/1977 | Chang | |
| 4,037,752 A | 7/1977 | Dulmaine et al. | |
| 4,117,062 A | 9/1978 | Uhlig | |
| 4,123,217 A | 10/1978 | Fischer et al. | |
| 4,125,632 A | 11/1978 | Vosti et al. | |
| 4,134,510 A | 1/1979 | Chang | |
| 4,170,622 A | 10/1979 | Uhlig et al. | |
| 4,174,782 A | 11/1979 | Obsomer | |
| 4,219,137 A | 8/1980 | Hutchens | |
| 4,231,483 A | 11/1980 | Dechenne et al. | |
| 4,247,012 A | 1/1981 | Alberghini | |
| 4,301,933 A | 11/1981 | Yoshino et al. | |
| 4,318,489 A | 3/1982 | Snyder et al. | |
| 4,318,882 A | 3/1982 | Agrawal et al. | |
| 4,321,483 A | 3/1982 | Dugan | |
| 4,338,765 A * | 7/1982 | Ohmori ..................... B65B 3/00 53/289 |
| 4,355,728 A | 10/1982 | Ota et al. | |
| 4,377,191 A | 3/1983 | Yamaguchi | |
| 4,378,328 A | 3/1983 | Przytulla | |
| 4,381,061 A | 4/1983 | Cerny et al. | |
| D269,158 S | 5/1983 | Gaunt et al. | |
| 4,386,701 A | 6/1983 | Galer et al. | |
| 4,412,866 A | 11/1983 | Schoenrock et al. | |
| 4,436,216 A | 3/1984 | Chang | |
| 4,444,308 A | 4/1984 | MacEwen | |
| 4,450,878 A | 5/1984 | Takada et al. | |
| 4,465,199 A | 8/1984 | Aoki | |
| 4,497,855 A | 2/1985 | Agrawal et al. | |
| 4,542,029 A | 9/1985 | Caner et al. | |
| 4,610,366 A | 9/1986 | Estes et al. | |
| 4,628,669 A | 12/1986 | Herron et al. | |
| 4,642,968 A | 2/1987 | McHenry et al. | |
| 4,645,078 A | 2/1987 | Reyner | |
| 4,662,154 A * | 5/1987 | Hayward ................ B65B 31/00 141/100 |
| 4,667,454 A | 5/1987 | McHenry et al. | |
| 4,684,025 A | 8/1987 | Copland et al. | |
| 4,685,273 A | 8/1987 | Caner et al. | |
| D292,378 S | 10/1987 | Brandt et al. | |
| 4,749,092 A | 6/1988 | Sugiura et al. | |
| 4,773,458 A | 9/1988 | Touzani | |
| 4,785,949 A | 11/1988 | Krishnakumar et al. | |
| 4,785,950 A | 11/1988 | Miller et al. | |
| 4,807,424 A | 2/1989 | Robinson et al. | |
| 4,813,556 A | 3/1989 | Lawrence | |
| 4,831,050 A | 5/1989 | Bettle | |
| 4,836,398 A | 6/1989 | Leftault, Jr. et al. | |
| 4,840,289 A | 6/1989 | Fait et al. | |
| 4,850,493 A | 7/1989 | Howard, Jr. | |
| 4,850,494 A | 7/1989 | Howard, Jr. | |
| 4,865,206 A | 9/1989 | Behm et al. | |
| 4,867,323 A | 9/1989 | Powers | |
| 4,880,129 A | 11/1989 | McHenry et al. | |
| 4,887,730 A | 12/1989 | Touzani | |
| 4,892,205 A | 1/1990 | Powers et al. | |
| 4,896,205 A | 1/1990 | Weber | |
| 4,921,147 A | 5/1990 | Poirier | |
| 4,967,538 A * | 11/1990 | Leftault, Jr. ......... B65D 79/005 53/426 |
| 4,976,538 A | 12/1990 | Ake | |
| 4,978,015 A | 12/1990 | Walker | |
| 4,997,692 A | 3/1991 | Yoshino | |
| 5,004,109 A | 4/1991 | Bartley | |
| 5,005,716 A | 4/1991 | Eberle | |
| 5,014,868 A | 5/1991 | Wittig et al. | |
| 5,024,340 A | 6/1991 | Alberghini et al. | |
| 5,033,254 A | 7/1991 | Zenger | |
| 5,060,453 A | 10/1991 | Alberghini et al. | |
| 5,067,622 A | 11/1991 | Garver et al. | |
| 5,090,180 A * | 2/1992 | Sorensen ................ B29C 51/00 53/281 |
| 5,092,474 A | 3/1992 | Leigner | |
| 5,133,468 A | 7/1992 | Brunson et al. | |
| 5,141,121 A | 8/1992 | Brown et al. | |
| 5,178,290 A | 1/1993 | Ota et al. | |
| 5,199,587 A | 4/1993 | Ota et al. | |
| 5,199,588 A | 4/1993 | Hayashi | |
| 5,201,438 A | 4/1993 | Norwood et al. | |
| 5,217,737 A | 6/1993 | Gygax et al. | |
| 5,234,126 A | 8/1993 | Jonas et al. | |
| 5,244,106 A * | 9/1993 | Takacs ................ B65D 1/0276 215/12.1 |
| 5,251,424 A | 10/1993 | Zenger et al. | |
| 5,255,889 A | 10/1993 | Collette et al. | |
| 5,261,544 A | 11/1993 | Weaver, Jr. | |
| 5,279,433 A | 1/1994 | Krishnakumar et al. | |
| 5,281,387 A | 1/1994 | Collette et al. | |
| 5,333,761 A | 8/1994 | Davis et al. | |
| 5,341,946 A | 8/1994 | Valliencourt et al. | |
| 5,392,937 A | 2/1995 | Prevot et al. | |
| 5,411,699 A | 5/1995 | Collette et al. | |
| 5,454,481 A | 10/1995 | Hsu | |
| 5,472,105 A | 12/1995 | Krishnakumar et al. | |
| 5,472,181 A | 12/1995 | Lowell | |
| RE35,140 E | 1/1996 | Powers, Jr. | |
| 5,484,052 A | 1/1996 | Pawloski et al. | |
| 5,503,283 A | 4/1996 | Semersky | |
| 5,593,063 A | 1/1997 | Claydon et al. | |
| 5,598,941 A | 2/1997 | Semersky et al. | |
| 5,632,397 A | 5/1997 | Fandeux et al. | |
| 5,642,826 A | 7/1997 | Melrose | |
| 5,672,730 A | 9/1997 | Cottman | |
| 5,690,244 A | 11/1997 | Darr | |

(56) References Cited

U.S. PATENT DOCUMENTS

| | | | |
|---|---|---|---|
| 5,704,504 A | 1/1998 | Bueno | |
| 5,713,480 A | 2/1998 | Petre et al. | |
| 5,730,314 A | 3/1998 | Wiemann et al. | |
| 5,730,914 A | 3/1998 | Ruppmann, Sr. | |
| 5,737,827 A | 4/1998 | Kuse et al. | |
| 5,758,802 A | 6/1998 | Wallays | |
| 5,762,221 A | 6/1998 | Tobias et al. | |
| 5,780,130 A | 7/1998 | Hansen et al. | |
| 5,785,197 A | 7/1998 | Slat | |
| 5,819,507 A * | 10/1998 | Kaneko | B65B 7/2878 53/473 |
| 5,829,614 A | 11/1998 | Collette et al. | |
| 5,858,300 A | 1/1999 | Shimizu et al. | |
| 5,860,556 A | 1/1999 | Robbins, III | |
| 5,887,739 A | 3/1999 | Prevot et al. | |
| 5,888,598 A | 3/1999 | Brewster et al. | |
| 5,897,090 A | 4/1999 | Smith et al. | |
| 5,906,286 A | 5/1999 | Matsuno et al. | |
| 5,908,128 A | 6/1999 | Krishnakumar et al. | |
| D415,030 S | 10/1999 | Searle et al. | |
| 5,976,653 A | 11/1999 | Collette et al. | |
| RE36,639 E | 4/2000 | Okhai | |
| 6,065,624 A | 5/2000 | Steinke | |
| 6,077,554 A | 6/2000 | Wiemann et al. | |
| 6,105,815 A | 8/2000 | Mazda et al. | |
| 6,213,325 B1 | 4/2001 | Cheng et al. | |
| 6,228,317 B1 | 5/2001 | Smith et al. | |
| 6,230,912 B1 | 5/2001 | Rashid | |
| 6,277,321 B1 | 8/2001 | Valliencourt et al. | |
| 6,298,638 B1 | 10/2001 | Bettle | |
| 6,375,025 B1 | 4/2002 | Mooney | |
| 6,390,316 B1 | 5/2002 | Mooney | |
| 6,413,466 B1 | 7/2002 | Boyd et al. | |
| 6,439,413 B1 | 8/2002 | Prevot et al. | |
| 6,467,639 B2 | 10/2002 | Mooney | |
| 6,485,669 B1 | 11/2002 | Boyd et al. | |
| 6,502,369 B1 | 1/2003 | Andison et al. | |
| 6,514,451 B1 | 2/2003 | Boyd et al. | |
| 6,585,124 B2 | 7/2003 | Boyd et al. | |
| 6,595,380 B2 | 7/2003 | Silvers | |
| 6,612,451 B2 * | 9/2003 | Tobias | B65D 1/0284 206/501 |
| 6,662,960 B2 | 12/2003 | Hong et al. | |
| 6,749,780 B2 | 6/2004 | Tobias | |
| 6,763,968 B1 | 7/2004 | Boyd et al. | |
| 6,769,561 B2 | 8/2004 | Futral et al. | |
| 6,779,673 B2 | 8/2004 | Melrose et al. | |
| 6,923,334 B2 | 8/2005 | Melrose et al. | |
| 6,935,525 B2 | 8/2005 | Trude | |
| 6,942,116 B2 | 9/2005 | Lisch et al. | |
| 6,983,858 B2 | 1/2006 | Slat et al. | |
| 7,051,889 B2 | 5/2006 | Boukobza | |
| 7,077,279 B2 | 7/2006 | Melrose | |
| 7,137,520 B1 | 11/2006 | Melrose | |
| 7,150,372 B2 * | 12/2006 | Lisch | B65D 1/0276 215/371 |
| 7,159,374 B2 * | 1/2007 | Abercrombie, III | B65D 81/2046 206/219 |
| 7,367,365 B2 | 5/2008 | Slat et al. | |
| 7,520,400 B2 | 4/2009 | Young et al. | |
| 7,543,713 B2 * | 6/2009 | Trude | B65D 1/0276 206/501 |
| 7,574,846 B2 * | 8/2009 | Sheets | B65D 1/0261 198/803.8 |
| 7,717,282 B2 | 5/2010 | Melrose | |
| 7,726,106 B2 | 6/2010 | Kelley et al. | |
| 7,735,304 B2 | 6/2010 | Kelley et al. | |
| 7,882,971 B2 * | 2/2011 | Kelley | B65D 1/0223 215/373 |
| 7,926,243 B2 | 4/2011 | Kelley et al. | |
| 8,127,955 B2 | 3/2012 | Denner et al. | |
| 8,152,010 B2 * | 4/2012 | Melrose | B65D 1/0276 215/373 |
| 8,381,940 B2 | 2/2013 | Melrose et al. | |
| 8,584,879 B2 | 11/2013 | Melrose et al. | |
| 8,627,944 B2 | 1/2014 | Kelley et al. | |
| 8,671,653 B2 * | 3/2014 | Kelley | B65B 21/12 53/440 |
| 8,720,163 B2 | 5/2014 | Melrose et al. | |
| 8,881,937 B2 * | 11/2014 | Derrien | B29C 49/48 220/675 |
| 9,145,223 B2 | 9/2015 | Melrose | |
| 9,211,968 B2 | 12/2015 | Melrose | |
| 9,387,971 B2 | 7/2016 | Melrose | |
| 9,624,018 B2 | 4/2017 | Melrose | |
| 9,731,884 B2 | 8/2017 | Melrose | |
| 9,802,730 B2 | 10/2017 | Melrose | |
| 9,878,816 B2 | 1/2018 | Melrose | |
| 2001/0035391 A1 * | 11/2001 | Young | B65D 1/0284 215/375 |
| 2002/0074336 A1 * | 6/2002 | Silvers | B65D 1/0276 220/623 |
| 2002/0096486 A1 | 7/2002 | Bourque et al. | |
| 2002/0153343 A1 | 10/2002 | Tobias et al. | |
| 2002/0158038 A1 | 10/2002 | Heisel et al. | |
| 2003/0015491 A1 | 1/2003 | Melrose et al. | |
| 2003/0186006 A1 | 10/2003 | Schmidt et al. | |
| 2003/0196926 A1 | 10/2003 | Tobias et al. | |
| 2003/0217947 A1 | 11/2003 | Ishikawa et al. | |
| 2004/0000533 A1 * | 1/2004 | Kamineni | B65D 1/0276 215/373 |
| 2004/0016716 A1 | 1/2004 | Melrose et al. | |
| 2004/0074864 A1 | 4/2004 | Melrose et al. | |
| 2004/0149677 A1 * | 8/2004 | Slat | B65D 1/0276 215/380 |
| 2004/0173565 A1 | 9/2004 | Semersky et al. | |
| 2004/0173656 A1 | 9/2004 | Seong | |
| 2004/0211746 A1 | 10/2004 | Trude | |
| 2004/0232103 A1 | 11/2004 | Lisch et al. | |
| 2006/0006133 A1 | 1/2006 | Lisch et al. | |
| 2006/0138074 A1 * | 6/2006 | Melrose | B65D 1/0276 215/373 |
| 2006/0231985 A1 | 10/2006 | Kelley | |
| 2006/0243698 A1 | 11/2006 | Melrose | |
| 2006/0255005 A1 * | 11/2006 | Melrose | B65B 7/2835 215/381 |
| 2006/0261031 A1 | 11/2006 | Melrose | |
| 2007/0017892 A1 | 1/2007 | Melrose | |
| 2007/0045312 A1 | 3/2007 | Abercrombie, III et al. | |
| 2007/0051073 A1 * | 3/2007 | Kelley | B65B 21/12 53/440 |
| 2007/0084821 A1 | 4/2007 | Bysick et al. | |
| 2007/0125743 A1 | 6/2007 | Pritchett et al. | |
| 2007/0181403 A1 | 8/2007 | Sheets et al. | |
| 2007/0199915 A1 | 8/2007 | Denner et al. | |
| 2007/0199916 A1 | 8/2007 | Denner et al. | |
| 2007/0215571 A1 * | 9/2007 | Trude | B29C 49/08 215/373 |
| 2007/0235905 A1 | 10/2007 | Trude et al. | |
| 2008/0047964 A1 | 2/2008 | Denner et al. | |
| 2009/0126323 A1 | 5/2009 | Kelley et al. | |
| 2009/0293436 A1 * | 12/2009 | Miyazaki | B65D 1/0261 53/471 |
| 2010/0018838 A1 | 1/2010 | Kelley | |
| 2010/0170199 A1 * | 7/2010 | Kelley | B65B 61/24 53/440 |

FOREIGN PATENT DOCUMENTS

| | | |
|---|---|---|
| DE | 1761753 | 1/1972 |
| DE | 2102319 | 8/1972 |
| DE | 3215866 | 11/1993 |
| EP | 346518 | 12/1989 |
| EP | 0521642 | 1/1993 |
| EP | 0551788 | 7/1993 |
| EP | 0666222 | 8/1995 |
| EP | 0609348 | 1/1997 |
| EP | 0916406 | 5/1999 |
| EP | 0957030 | 11/1999 |
| EP | 1063076 | 12/2000 |
| EP | 1565381 | 8/2005 |

(56) References Cited

FOREIGN PATENT DOCUMENTS

| | | |
|---|---|---|
| FR | 1571499 | 6/1969 |
| FR | 2607109 | 5/1988 |
| GB | 0781103 | 8/1957 |
| GB | 1113988 | 5/1968 |
| GB | 2050919 | 1/1981 |
| GB | 2372977 | 9/2002 |
| GE | 200677 U | 8/2000 |
| JP | 48-31050 | 9/1973 |
| JP | 49-28628 | 7/1974 |
| JP | 54-72181 | 6/1979 |
| JP | 56-072730 | 6/1981 |
| JP | 55-114717 | 2/1982 |
| JP | 63-189224 | 8/1988 |
| JP | 64-009146 | 1/1989 |
| JP | 03-43342 | 2/1991 |
| JP | 03-076625 | 4/1991 |
| JP | 05-193694 | 8/1992 |
| JP | 06-336238 | 12/1994 |
| JP | 07-300121 | 11/1995 |
| JP | 8053115 | 2/1996 |
| JP | 08-253220 | 10/1996 |
| JP | 09-039934 | 2/1997 |
| JP | 09-110045 | 4/1997 |
| JP | 10-167226 | 6/1998 |
| JP | 10-181734 | 7/1998 |
| JP | 10-230919 | 9/1998 |
| JP | 2000-168756 | 6/2000 |
| JP | 2000-229615 | 8/2000 |
| JP | 2002-127237 | 5/2002 |
| JP | 2006-501109 | 1/2006 |
| NZ | 240448 | 6/1995 |
| NZ | 296014 | 10/1998 |
| NZ | 335565 | 10/1999 |
| NZ | 506684 | 8/2000 |
| NZ | 512423 | 6/2001 |
| NZ | 521694 | 10/2003 |
| RU | 2021956 | 10/1994 |
| RU | 2096288 | 11/1997 |
| WO | WO 93/09031 | 5/1993 |
| WO | WO 93/12975 | 7/1993 |
| WO | WO 94/05555 | 3/1994 |
| WO | WO 97/03885 | 2/1997 |
| WO | WO 97/014617 | 4/1997 |
| WO | WO 97/034808 | 9/1997 |
| WO | WO 99/021770 | 5/1999 |
| WO | WO 00/51895 | 9/2000 |
| WO | WO 01/040081 | 6/2001 |
| WO | WO 02/02418 | 1/2002 |
| WO | WO 02/18213 | 3/2002 |
| WO | WO 02/085755 | 10/2002 |
| WO | WO 04/028910 | 4/2004 |
| WO | WO 04/106175 | 12/2004 |
| WO | WO 04/106176 | 12/2004 |
| WO | WO 05/012091 | 2/2005 |
| WO | WO 06/113428 | 10/2006 |
| WO | WO 07/127337 | 11/2007 |

OTHER PUBLICATIONS

IPRP (including Written Opinion) for PCT/US/2004/024581 dated Jan. 30, 2006.
IPRP for PCT/NZ03/00220, completed Jan. 11, 2005.
IPRP with Written Opinion for PCT/US2007/010182, Oct. 28, 2008.
ISR for PCT/NZ01/000176 (WO 02/018213) mailed Nov. 8, 2001.
ISR for PCT/NZ03/00220, mailed Nov. 27, 2003.
European Search Report (suppl.) of EP 03748817, dated Jul. 9, 2007.
ISR for PCT/US2004/016405 dated Feb. 15, 2005.
IPRP (including Written Opinion) for PCT/US/2004/016405 dated Nov. 25, 2005.
National Intellectual Property Center of Georgia "SAKPATENTI", Search Report in Filing No. 8770/01, Application No. AP2003 008770, GE19049, Mar. 1, 2006.
ISR for PCT/US2007/010182, Oct. 19, 2007, 3 pp.
Office Action for European App. No. 07794381.9 dated Nov. 21, 2012.
Office Action for European App. No. 07794381.9 dated Dec. 8, 2011.
U.S. Appl. No. 10/566,294, Kelley File History.
U.S. Appl. No. 10/529,198, Melrose File History.
U.S. Appl. No. 11/704,338, Denner File History.
U.S. Appl. No. 11/413,124, Melrose File History.
U.S. Appl. No. 11/704,368, Melrose File History.
U.S. Appl. No. 12/325,452, Kelley File History.
U.S. Appl. No. 12/885,533, Melrose File History.
U.S. Appl. No. 13/442,846, Melrose File History.
U.S. Appl. No. 14/187,217, Melrose File History.
IPRP with Written Opinion for PCT/US2007/010182, dated Oct. 28, 2008.
Office Action for Chinese App. No. 200780022545.0 dated Mar. 23, 2010.

* cited by examiner

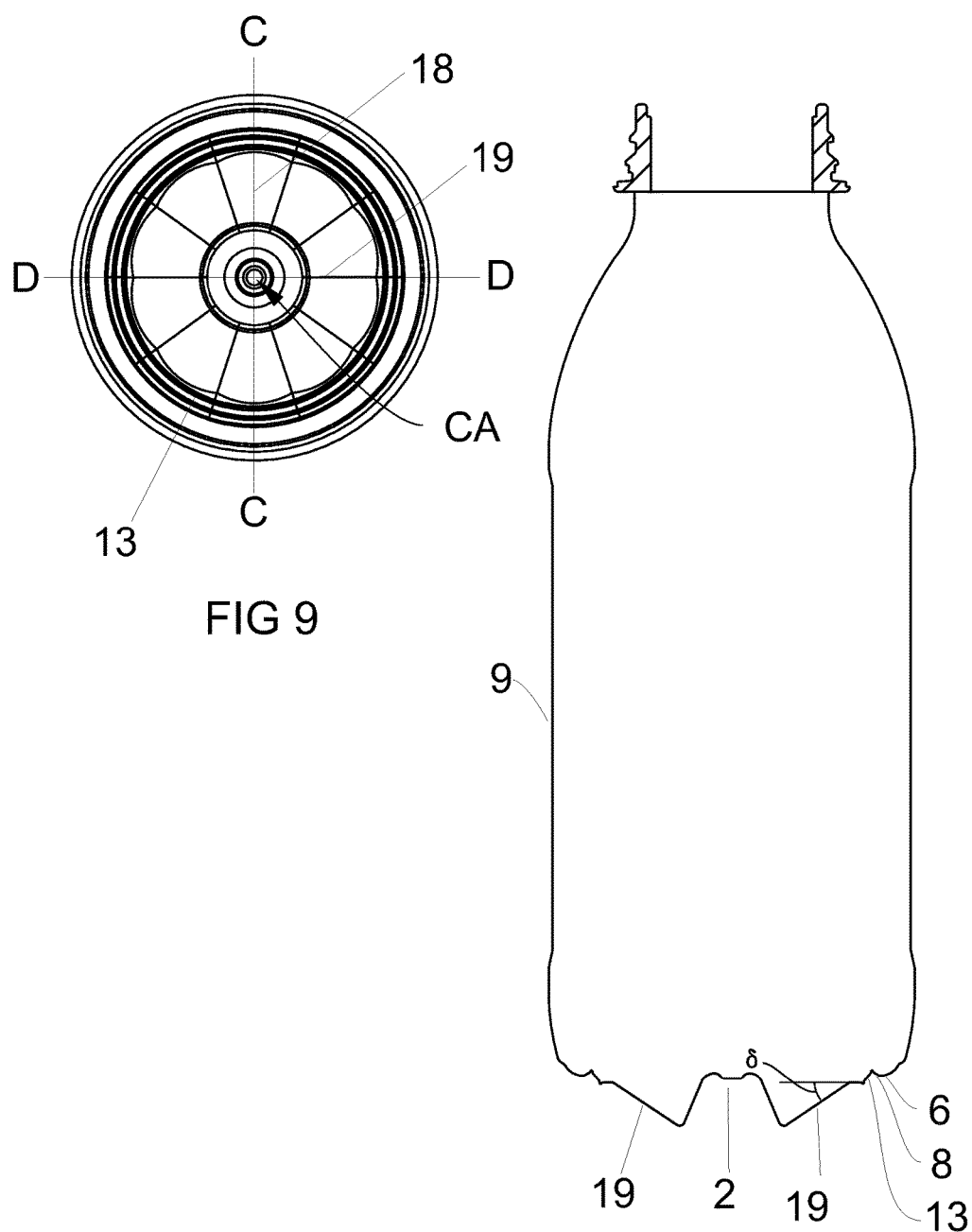

CONTAINER STRUCTURE FOR REMOVAL OF VACUUM PRESSURE

CROSS REFERENCE TO RELATED APPLICATIONS

This application is a Continuation of Ser. No. 13/442,846, filed Apr. 9, 2012, published as US2013/0068779, currently pending, which is a Continuation of Ser. No. 10/529,198, filed Dec. 15, 2005, published as US2006/0138074, now U.S. Pat. No. 8,152,010, which is a Section 371 of PCT/NZ03/00220, filed Sep. 30, 2003, published as WO/2004/028910, which claims priority to NZ521694 filed Sep. 30, 2002, the content of all of which are hereby incorporated by reference.

FIELD

This invention relates generally to a container structure that allows for the removal of vacuum pressure. This is achieved by inverting a transversely oriented vacuum pressure panel located in the lower end-wall, or base region of the container.

BACKGROUND

So called 'hot fill' containers are well known in prior art, whereby manufacturers supply PET containers for various liquids which are filled into the containers and the liquid product is at an elevated temperature, typically at or around 85 degrees C. (185 degrees F.).

The container is manufactured to withstand the thermal shock of holding a heated liquid, resulting in a 'heat-set' plastic container. This thermal shock is a result of either introducing the liquid hot at filling, or heating the liquid after it is introduced into the container.

Once the liquid cools down in a capped container, however, the volume of the liquid in the container reduces, creating a vacuum within the container. This liquid shrinkage results in vacuum pressures that pull inwardly on the side and end walls of the container. This in turn leads to deformation in the walls of plastic bottles if they are not constructed rigidly enough to resist such force.

Typically, vacuum pressures have been accommodated by the use of vacuum panels, which distort inwardly under vacuum pressure. Prior art reveals many vertically oriented vacuum panels that allow containers to withstand the rigors of a hot fill procedure. Such vertically oriented vacuum panels generally lie parallel to the longitudinal axis of a container and flex inwardly under vacuum pressure toward this longitudinal axis.

In addition to the vertically oriented vacuum panels, many prior art containers also have flexible base regions to provide additional vacuum compensation. Many prior art containers designed for hot-filling have various modifications to their end-walls, or base regions to allow for as much inward flexure as possible to accommodate at least some of the vacuum pressure generated within the container.

All such prior art, however, provides for flat or inwardly inclined, or recessed base surfaces. These have been modified to be susceptible to as much further inward deflection as possible. As the base region yields to the force, it is drawn into a more inclined position than prior to having vacuum force applied.

Unfortunately, however, the force generated under vacuum to pull longitudinally on the base region is only half that force generated in the transverse direction at the same time. Therefore, vertically oriented vacuum panels are able to react to force more easily than a panel placed in the base. Further, there is a lot more surface area available around the circumference of a container than in the end-wall. Therefore, adequate vacuum compensation can only be achieved by placing vertically-oriented vacuum panels over a substantial portion of the circumferential wall area of a container, typically 60% of the available area.

Even with such substantial displacement of vertically-oriented panels, however, the container requires further strengthening to prevent distortion under the vacuum force.

The liquid shrinkage derived from liquid cooling, causes a build up of vacuum pressure. Vacuum panels deflect toward this negative pressure, to a degree lessening the vacuum force, by effectively creating a smaller container to better accommodate the smaller volume of contents. However, this smaller shape is held in place by the generating vacuum force. The more difficult the structure is to deflect inwardly, the more vacuum force will be generated. In prior art, a substantial amount of vacuum is still present in the container and this tends to distort the overall shape unless a large, annular strengthening ring is provided in horizontal, or transverse, orientation at least a ⅓ of the distance from an end to the container.

Considering this, it has become accepted knowledge to believe that it is impossible to provide for full vacuum compensation through modification to the end-wall or base region alone. The base region offers very little surface area, compared to the side walls, and reacts to force at half the rate of the side walls.

Therefore it has become accepted practice to only expect partial assistance to the overall vacuum compensation to be generated through the base area. Further, even if the base region could provide for enough flexure to accommodate all liquid shrinkage within the container, there would be a significant vacuum force present, and significant stress on the base standing ring. This would place force on the sidewalls also, and to prevent distortion the smooth sidewalls would have to be much thicker in material distribution, be strengthened by ribbing or the like, or be placed into shapes more compatible to mechanical distortion (for example be square instead of circular).

For this reason it has not been possible to provide container designs in plastic that do not have typical prior art vacuum panels that are vertically oriented on the sidewall. Many manufacturers have therefore been unable to commercialize plastic designs that are the same as their glass bottle designs with smooth sidewalls.

U.S. Pat. No. 6,595,380 (Silvers), claims to provide for full vacuum compensation through the base region without requiring positioning of vertically oriented vacuum panels on the smooth sidewalls. This is suggested by combining techniques well-known and practiced in the prior art. Silvers provides for a slightly inwardly domed, and recessed base region to provide further inward movement under vacuum pressure. However, the technique disclosed, and the stated percentage areas required for efficiency are not considered by the present applicant to provide a viable solution to the problem.

In fact, flexure in the base region is recognised to be greatest in a horizontally flat base region, and maximizing such flat portions on the base has been well practiced and found to be unable to provide enough vacuum compensation to avoid also employing vertically oriented vacuum panels.

Silvers does provide for the base region to be strengthened by coupling it to the standing ring of the container, in order to assist preventing unwanted outward movement of the inwardly inclined or flat portion when a heated liquid builds up initial internal pressure in a newly filled and capped container. This coupling is achieved by rib structures, which also serve to strengthen the flat region. Whilst this may strengthen the region in order to allow more vacuum force to be applied to it, the ribs conversely further reduce flexibility within the base region, and therefore reduce flexibility.

It is believed by the present applicant that the specific 'ribbed' method proposed by Silvers could only provide for approximately 35% of the vacuum compensation that is required, as the modified end-wall is not considered capable of sufficient inward flexure to fully account for the liquid shrinkage that would occur. Therefore a strong maintenance of vacuum pressure is expected to occur. Containers employing such base structure therefore still require significant thickening of the sidewalls, and as this is done the base region also becomes thicker during manufacturing. The result is a less flexible base region, which in turn also reduces the efficiency of the vacuum compensation achieved.

The present invention relates to a hot-fill container which is a development of the hot-fill container described in our international application WO 02/18213 (the PCT specification), which specification is incorporated herein in its entirety where appropriate.

The PCT specification backgrounds the design of hot-fill containers and the problems with such designs which were overcome or at least ameliorated by the design disclosed in the PCT specification.

In the PCT specification a semi-rigid container was provided that had a substantially vertically folding vacuum panel portion. Such a transversely oriented vacuum panel portion included an initiator portion and a control portion which generally resisted being expanded from the collapsed state.

Further described in the PCT specification is the inclusion of the vacuum panels at various positions along the container wall.

A problem exists when locating such a panel in the end-wall or base region, whereby stability may be compromised if the panel does not move far enough into the container longitudinally to no longer form part of the container touching the surface the container stands on.

A further problem exists when utilizing a transverse panel in the base end-wall due to the potential for shock deflection of the inverted panel when a full and capped container is dropped. This may occur on a container with soft and unstructured walls that is dropped directly on its side. The shock deflection of the sidewalls causes a shock-wave of internal pressure that acts on the panel. In such cases improved panel configurations are desired that further prevent panel roll-out, or initiator region configurations utilized that optimize for resistance to such reversion displacement.

In view of the above, it is an object of one preferred embodiment of the present invention to provide a plastic container structure having a transversely oriented pressure panel in its lower portion that can provide for removal of vacuum pressure such that there is substantially no remaining force within the container.

It is a further object of one preferred embodiment of the present invention to provide a container which has a transversely oriented pressure panel that is decoupled to a degree from the adjoining wall such that greater inward and longitudinal movement can be achieved.

It is a further object of one preferred embodiment of the present invention to provide for a container to have a transversely oriented pressure panel that is inwardly displaced to a position above the standing ring of the final container configuration, such that a new base region is formed with a greater standing ring or foot print area, and the pressure panel is substantially protected from top load force applied to the container during commercial distribution.

It is a further object of one preferred embodiment of the present invention to provide for an improved transverses oriented pressure panel having an initiator portion which may utilize essentially the same angle as the control portion, such that greater removal of vacuum pressure can be obtained and such that greater resistance to outward deflection can also be obtained.

A further and alternative object of the present invention in all its embodiments, all the objects to be read disjunctively, is to at least provide the public with a useful choice.

SUMMARY

According to one aspect of the present invention there is provided a container having a longitudinal axis, an upper portion having an opening into said container, a body portion extending from said upper portion to a lower portion, said lower portion including a base, said base closing off an end of said container, said container having at least one substantially transversely oriented pressure panel portion located in said lower portion, said pressure panel portion being capable of folding from one longitudinally inclined position to an inverted position to compensate for a change of pressure induced within the container.

According to a further aspect of the present invention a container has a longitudinal axis and a base, and at least one substantially transversely oriented vacuum panel portion located adjacent to said base, said vacuum panel portion being adapted in use to fold from a longitudinally inclined position to an inverted position to compensate for a change of pressure induced within the container following cooling of a liquid within the container after it has been capped, such that less force is exerted on the internal walls of said container.

According to a further aspect of the present invention a container has a longitudinal axis, a side wall and a base closing off one end, said container having a single substantially transversely oriented vacuum panel portion located within the base and joined to the side wall by a decoupling or hinge structure, said vacuum panel portion being adapted in use to fold from a longitudinally inclined position to an inverted position to compensate for 2 change of pressure induced within the container.

Preferably in one embodiment the vacuum panel portion may include an initiator section and a control section, said initiator section providing for folding before said control section.

Preferably in one embodiment a decoupling structure connects the pressure panel portion with the body portion and is of an area which allows for greater inward and upward longitudinal movement of the pressure panel.

Preferably in one embodiment the vacuum panel portion has no strengthening ribs to restrain substantial longitudinal movement and inversion.

Preferably in one embodiment the vacuum panel portion may include fluting structures or the like to allow an even circumferential distribution of folding forces to provide for increased control over folding the panel portion from one inclined position to another and to assist in preventing unwanted return to the original position.

Preferably in one embodiment after folding, the container standing support is provided by a lower part of the container sidewall that provides a replacement container standing support.

According to a further aspect of the invention a method of compensating for a change in pressure in a container as defined in any one of the preceding eight paragraphs is provided in which said method includes applying a force to the or each said panel portion to cause said folding to occur.

According to a further aspect of this invention there is provided a hot-fill container substantially as herein described with reference to any one of the embodiments of the accompanying drawings.

Further aspects of the invention which should be considered in all its novel aspects will become apparent from the following description.

These and other examples are set forth more fully below in conjunction with drawings, a brief description of which follows.

BRIEF DESCRIPTION OF THE DRAWINGS

FIG. 9: shows an underneath view of the base of the container of FIGS. 8a and 8b and FIG. 10 before collapsing FIG. 10: shows a cross-sectional view of the container shown in FIG. 9 through line D-D

DETAILED DESCRIPTION

The following description of preferred embodiments is merely exemplary in nature, and is in no way intended to limit the invention or its application or uses.

As discussed above, to accommodate vacuum forces during cooling of the contents within a heat set container, containers have typically been provided with a series of vacuum panels around their sidewalls and an optimized base portion. The vacuum panels deform inwardly, and the base deforms upwardly, under the influence of the vacuum forces. This prevents unwanted distortion elsewhere in the container. However, the container is still subjected to internal vacuum force. The panels and base merely provide a suitably resistant structure against that force. The more resistant the structure the more vacuum force will be present. Additionally, end users can feel the vacuum panels when holding the containers.

Figure 20:
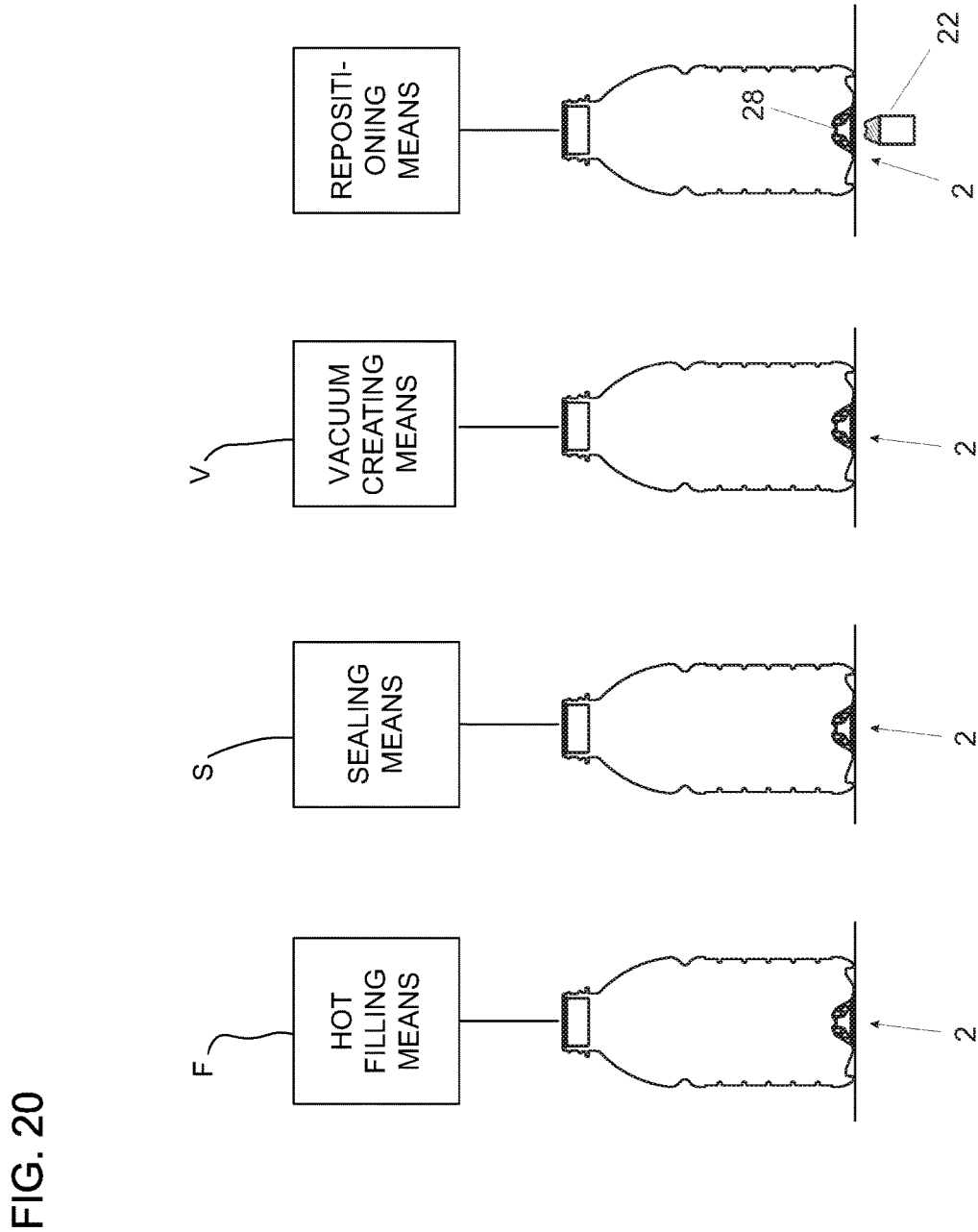
FIG. 20 is a schematic representation of a system for handling plastic containers.
Figure 21:
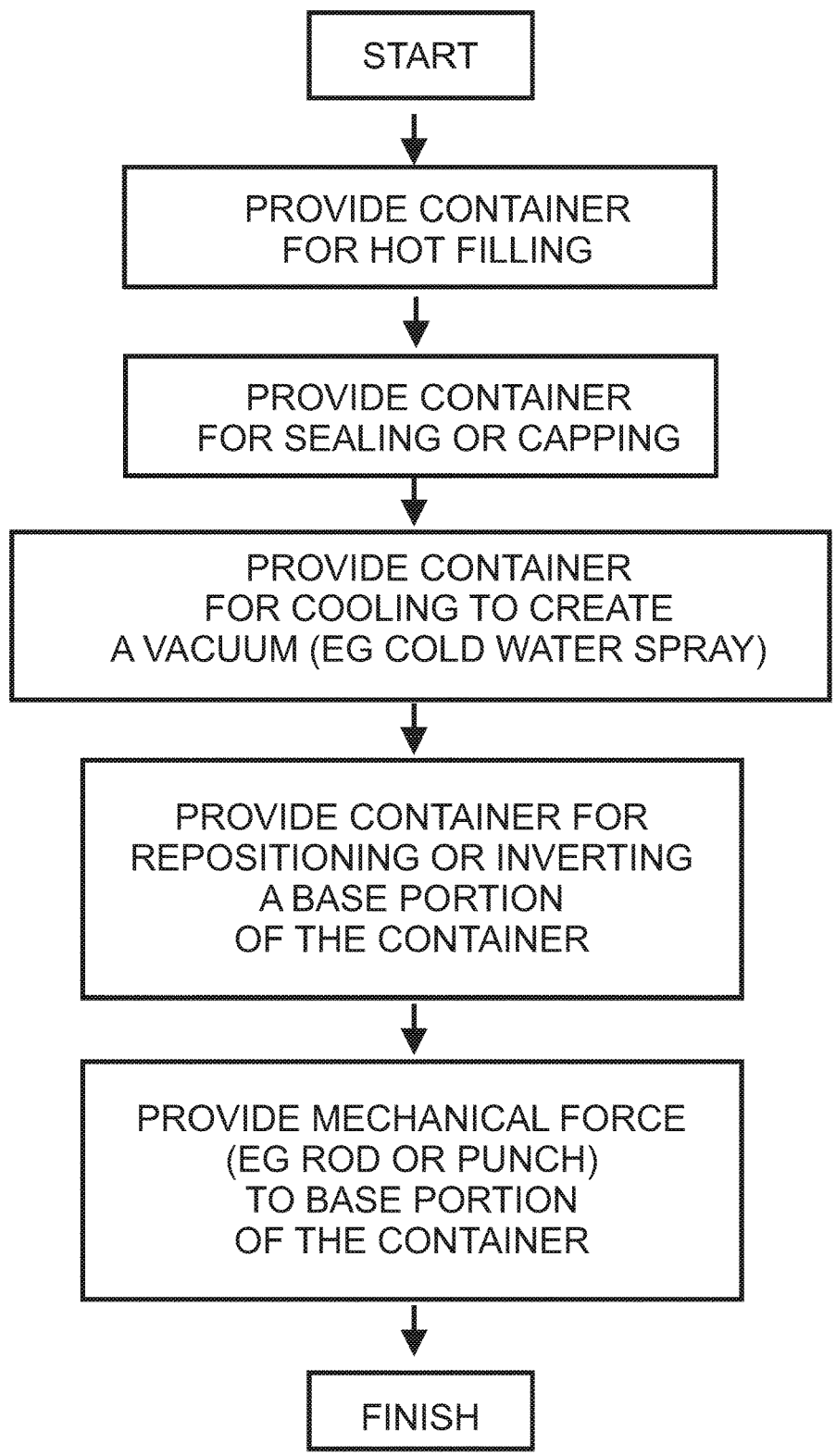
FIG. 21 is a schematic representation of handling plastic containers.

Typically at a bottling plant the containers will be filled with a hot liquid, for example by way of hot filling means F (FIGS. 20 and 21), and then capped, for example by way of a sealing means S, before being subjected to a cold water spray, for example by way of a vacuum creating means V, resulting in the formation of a vacuum within the container which the container structure needs to be able to cope with. The present invention relates to hot-fill containers and a structure that provides for the substantial removal or substantial negation of vacuum pressure. This allows much greater design freedom and light weighting opportunities as there is no longer any requirement for the structure to be resistant to vacuum forces which would otherwise mechanically distort the container.

As mentioned above and in the PCT specification, various proposals for hot-fill container designs have been put forward.

Further development of the hot-fill container of the PCT specification has positioned an outwardly inclined and transversely oriented vacuum panel between the lower portion of the side wall and the inwardly domed base region. In this position the container has poor stability, insofar as the base region is very narrow in diameter and does not allow for a good standing ring support. Additionally, there is preferably provided a decoupling structure that provides a hinge joint to the juncture of the vacuum panel and the lower sidewall. This decoupling structure provides for a larger range of longitudinal movement of the vacuum panel than would occur if the panel was coupled to the side wall by way of ribs for example. One side of the decoupling structure remains adjacent the sidewall, allowing the opposite side of the decoupling structure, adjacent to an initiator portion to bend inwardly and upwardly. The decoupling structure therefore provides for increased deflection of the initiator portion, allowing increased movement of the panel portion longitudinally away from the previously outwardly inclined position, enabling the panel portion to fold inwardly relative to the container and upwardly relative to the initial base position. The lower sidewall is therefore subjected to lower force during such inversion. During this action, the base portion is translated longitudinally upward and into the container.

Further, as the panel portion folds inwardly and upwardly, the decoupling structure allows for the vacuum panel to now form part of the container base portion. This development has at least two important advantages.

Firstly, by providing the vacuum panel so as to form part of the base after folding, a mechanical force can now be provided immediately against the panel in order to apply inverting force. This allows much greater control over the action, which may for example be applied by a mechanical pusher, which would engage with the container base in resetting the container shape. This allows increased design options for the initiator portion.

Secondly, the transversely oriented vacuum panel is effectively completely removed from view as it is forced from an outward position to an inward position. This means that there are no visible design features being imposed on the major portion of the side wall of the container in order to incorporate vacuum compensation. If required therefore, the major portion of the side wall of the present invention could have no structural features and the container could, if required, replicate a clear wall glass container. Alternatively, as there will be little or no vacuum remaining in the container after the panel is inverted, any design or shape can now be utilized, without regard for integrity against vacuum forces found in other hot-fill packages.

Such a manoeuvre allows for a wide standing ring to be obtained. The decoupling structure provides for the panel to become displaced longitudinally so that there is no contact between any part of the panel or upwardly domed base portion with the contact surface below. A standing ring is then provided by the lower sidewall immediately adjacent the decoupling structure.

Further, by gaining greater control over the inverting motion and forces, it is possible to allow the initiator portion to share the same steep angle as the control portion. This allows for increased volume displacement during inversion and increased resistance to any reversion back to the original position.

Figure 1:
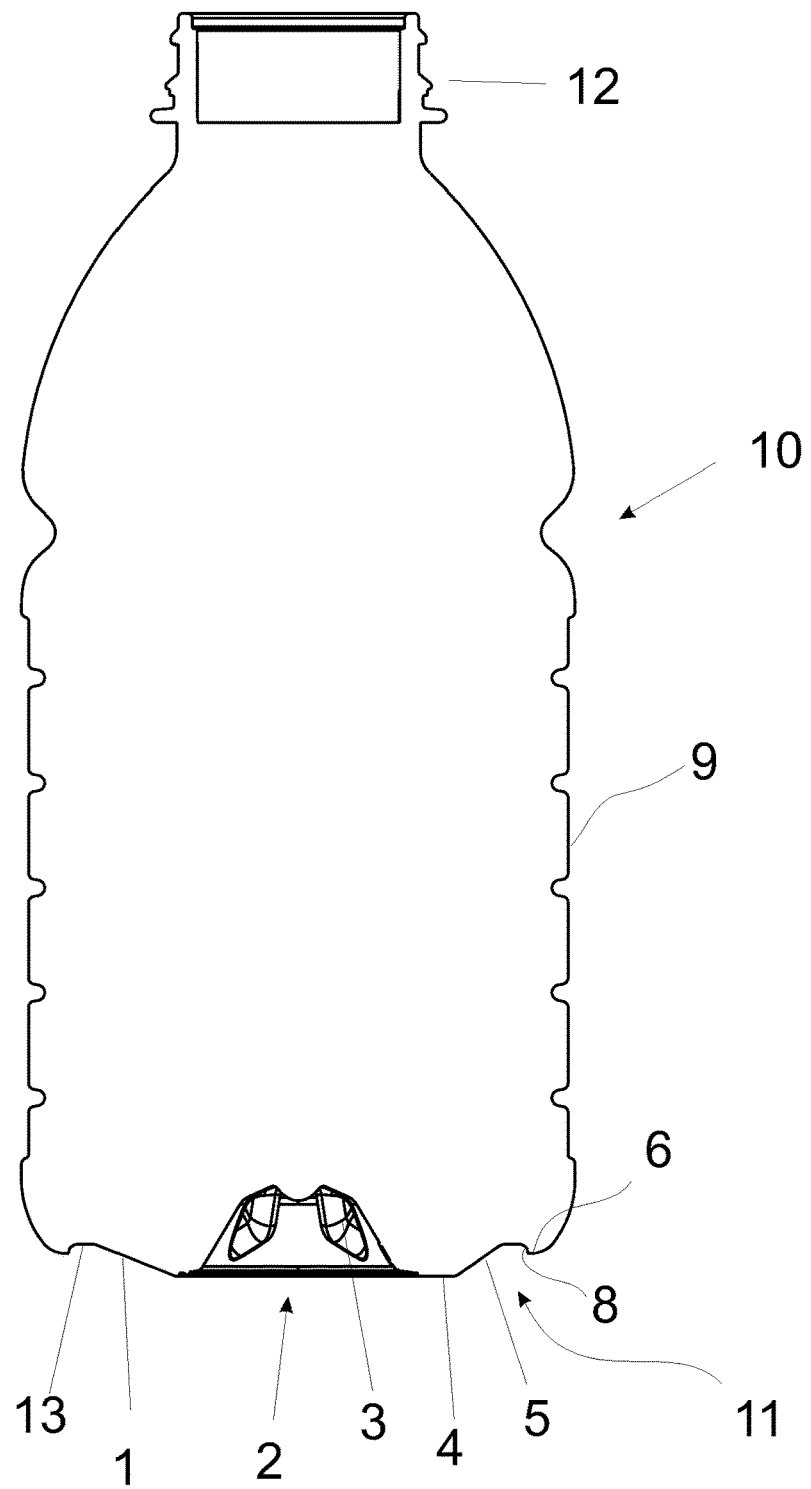
FIG. 1: shows a cross-sectional view of a hot-fill container according to one possible embodiment of the invention in its pre-collapsed condition.

Referring to the accompanying drawings, FIG. 1 shows, by way of example only, and in a diagrammatic cross sectional view, a container in the form of a bottle. This is referenced generally by arrow 10 with a typical neck portion 12 and a side wall 9 extending to a lower portion of the side wall 11 and an underneath base portion 2.

The container 10 will typically be blow moulded from any suitable plastics material but typically this will be polyethylene terephthalate (PET).

The base 2 is shown provided with a plurality of reinforcing ribs 3 so as to form the typical "champagne" base although this is merely by way of example only.

In FIG. 1 the lower side wall portion 11, which operates as a pressure panel, is shown in its unfolded position so that a ring or annular portion 6 is positioned above the level of the bottom of the base 2 which is forming the standing ring or support 4 for the container 10.

Figure 2:
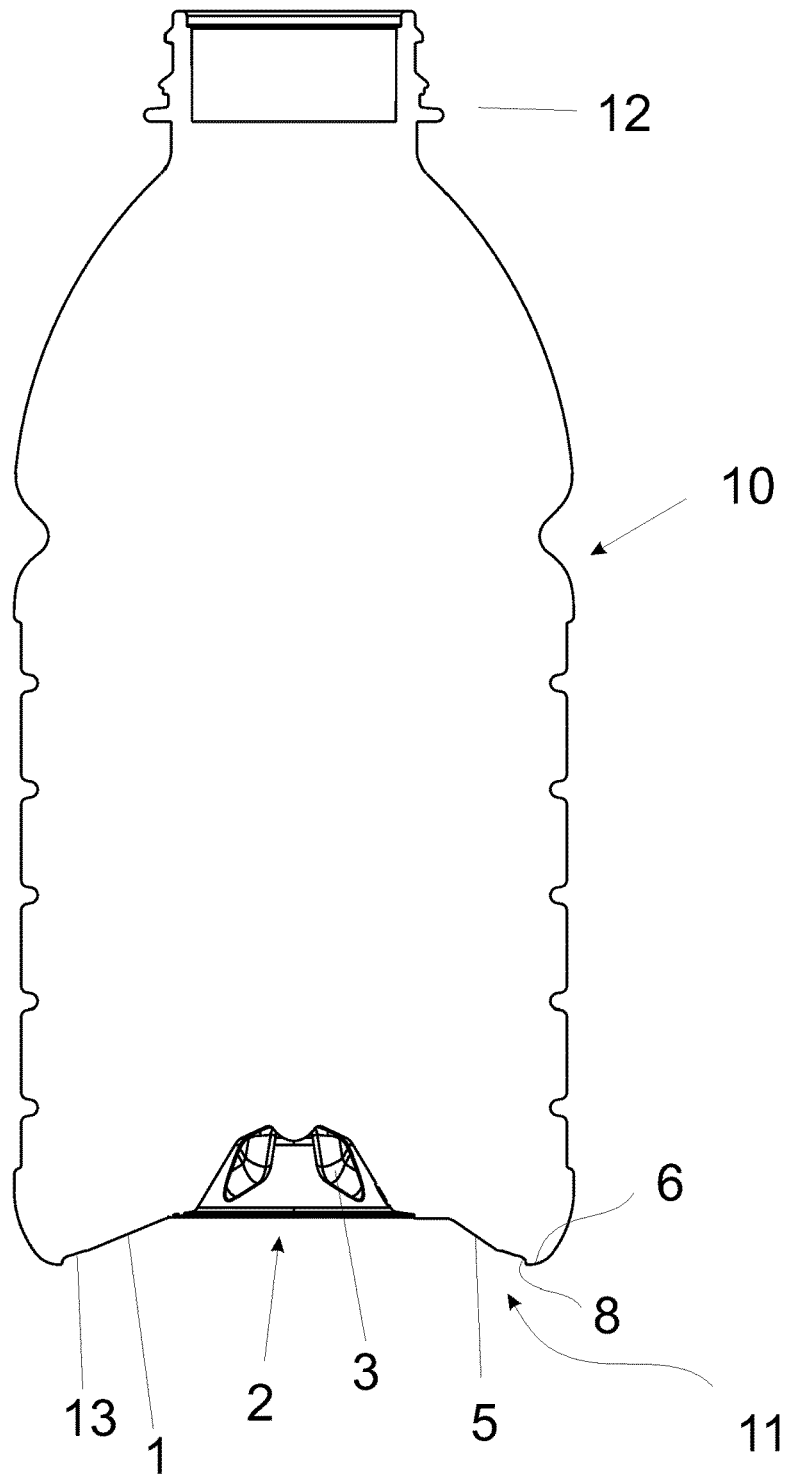
FIG. 2: shows the container of FIG. 1 in its collapsed position.

In FIG. 2 the lower side wall portion 11 is shown having folded inwardly so that the ring or annular portion 6 is positioned below the level of the bottom of the base 2 and is forming the new standing ring or support for the container 10.

Figure 3:
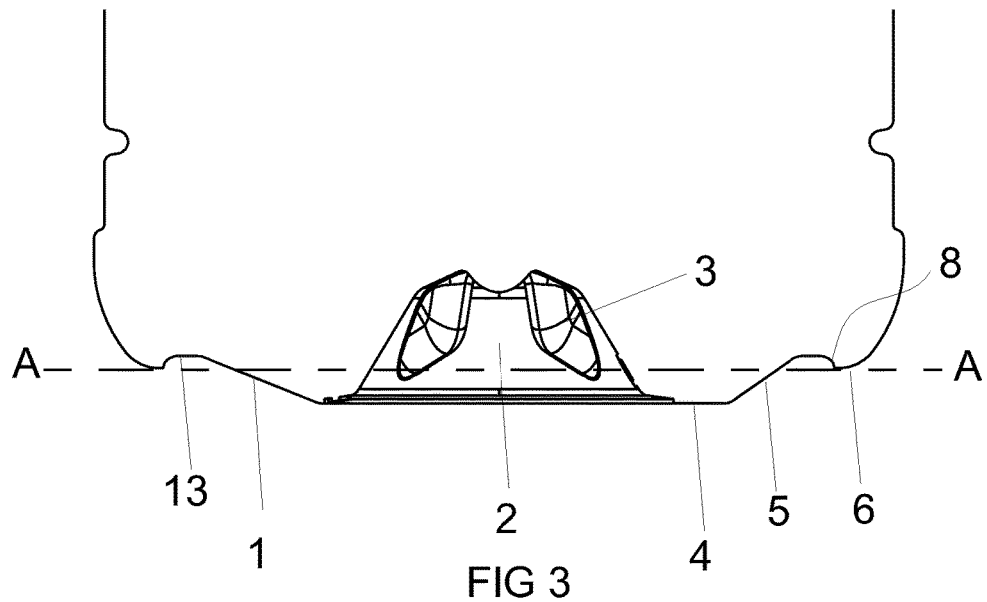
FIG. 3: shows the base of FIG. 1 before collapsing.
Figure 4:
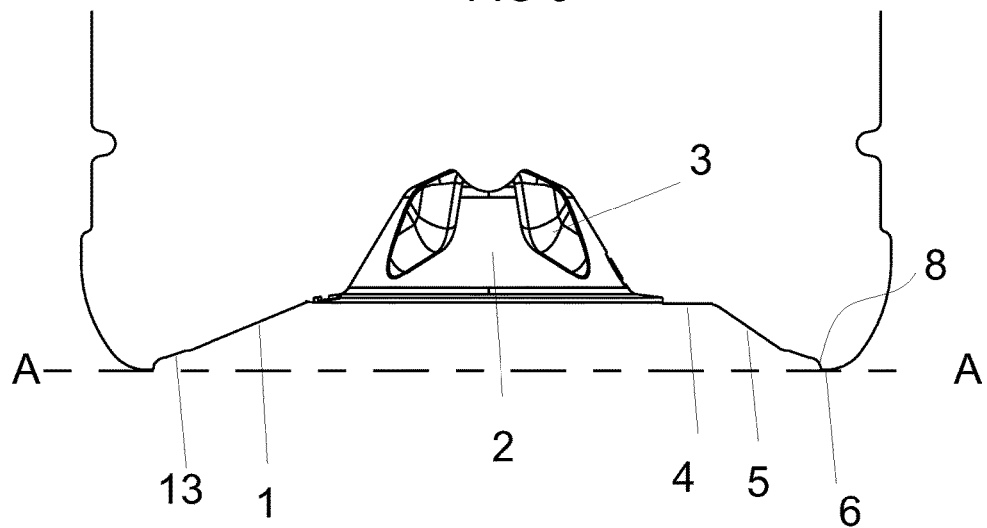
FIG. 4: shows the base of FIG. 2 following collapsing.

To assist this occurring, and as will be seen particularly in FIGS. 3 and 4, immediately adjacent the ring or annular portion 6 there may be an instep or recess 8 and decoupling structure 13, in this case a substantially flat, non-ribbed region, which after folding enables the base portion 2 to effectively completely disappear within the bottom of the container and above the line A-A. Many other configurations for the decoupling structure 13 are envisioned, however.

Figure 5:
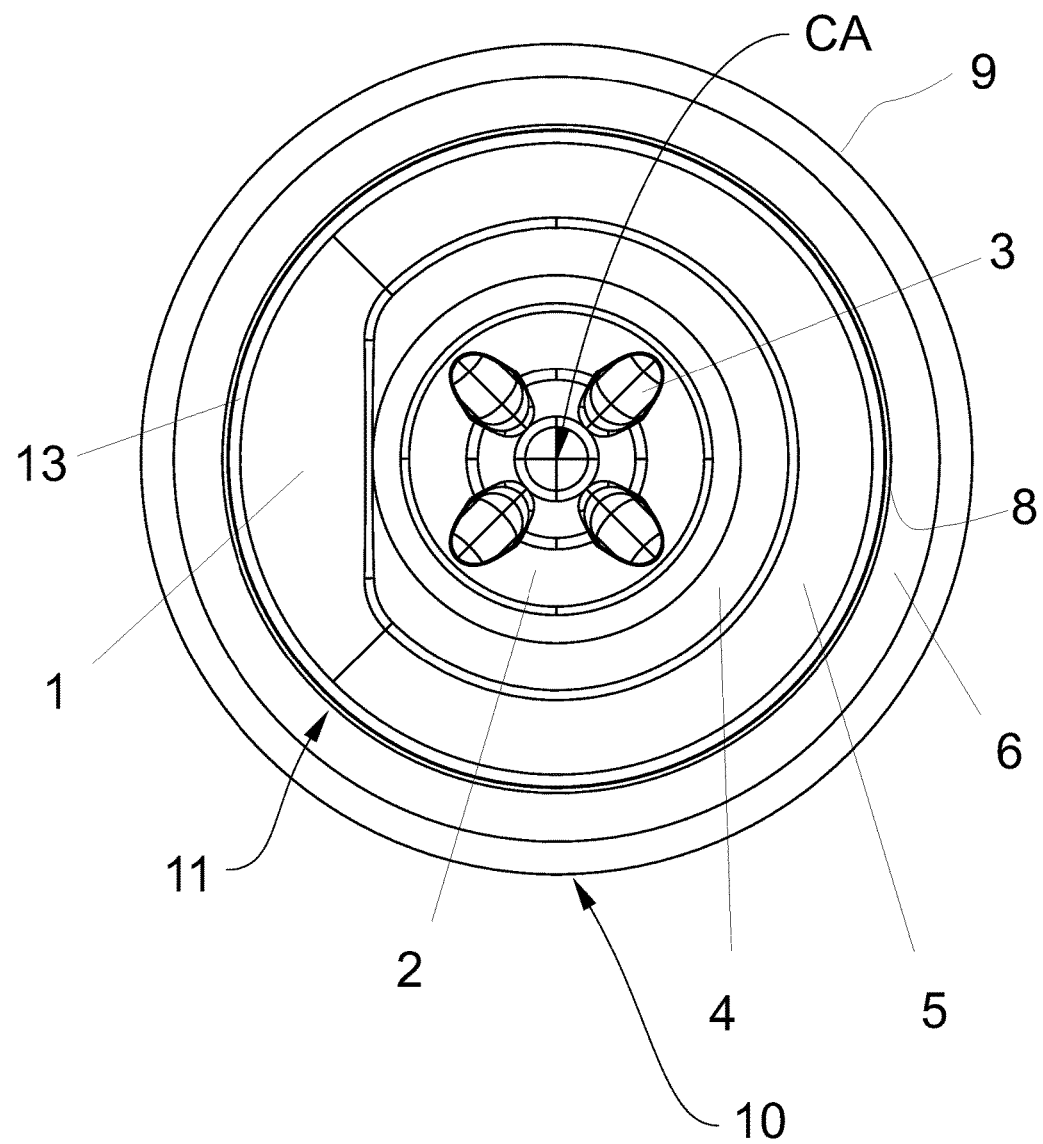
FIG. 5: shows an underneath view of the base of the container of FIG. 1 before collapsing.

Referring now particularly to FIG. 5, the base 2 with its strengthening ribs 3 is shown surrounded by the bottom annular portion 11 of the side wall 9 and the annular structure 13. The bottom portion 11 is shown in this particular embodiment as having an initiator portion 1 which forms part of the collapsing or inverting section which yields to a longitudinally-directed collapsing force before the rest of the collapsing or folding section. The base 2 is shown provided within the typical base standing ring 4, which will be the first support position for the container 10 prior to the inversion of the folding panel.

Associated with the initiator portion 1 is a control portion 5 which in this embodiment is a more steeply angled inverting section which will resist standing from the collapsed state.

Forming the outer perimeter of the bottom portion 11 of the side wall 9 is shown the side wall standing ring or annular portion 6 which following collapsing of the panel 11 will provide the new container support.

Figure 6:
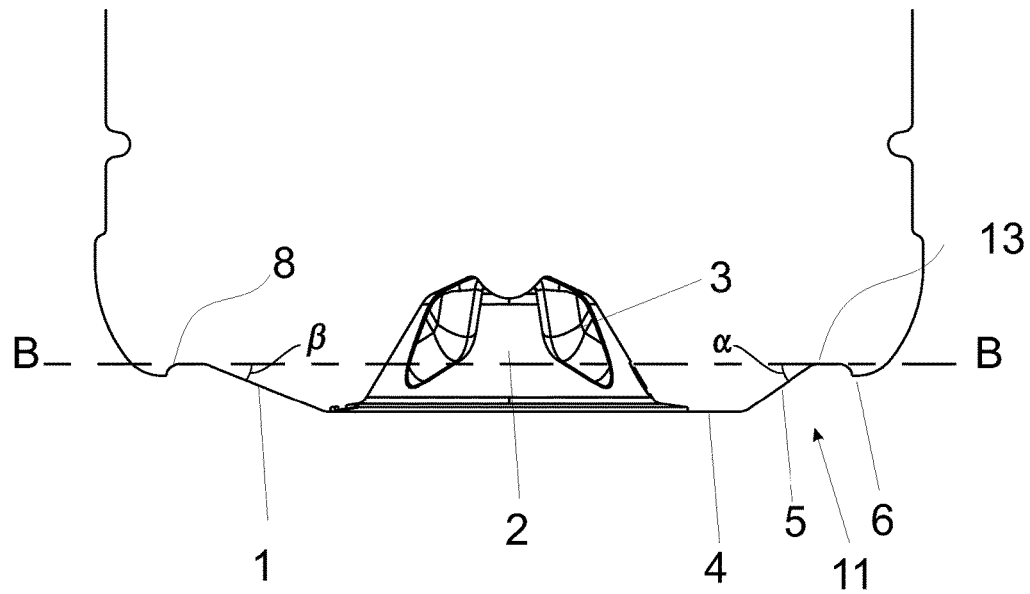
FIG. 6: shows the base of FIG. 1 before collapsing.

To allow for increased evacuation of vacuum it will be appreciated that it is preferable to provide a steep angle to the control portion 5 of the pressure panel 11. As shown in FIG. 6 the panel control portion 5 is generally set with an angle $\alpha$ with respect to a plane orthogonal to the container's longitudinal axis, or using the longitudinal axis as the reference, the angle $\alpha$ plus 90 degrees. The panel control portion 5 is generally set with an angle $\alpha$ varying between 30 degrees and 45 degrees, or in a range of about 120 degrees to about 135 degrees relative to the longitudinal axis. It is preferable to ensure an angle is set above 10 degrees at least, or above 100 degrees relative to the longitudinal axis. The initiator portion 1 may in this embodiment have a lesser angle $\beta$ of perhaps at least 10 degrees less than the control portion.

By way of example, it will be appreciated that when the panel 11 is inverted by mechanical compression it will undergo an angular change that is double that provided to it. If the conical control portion 5 is set to 10 degrees, or about 100 degrees relative to the longitudinal axis, it will provide a panel change equivalent to 20 degrees. At such a low angle it has been found to provide an inadequate amount of vacuum compensation in a hot-filled container. Therefore it is preferable to provide much steeper angles.

Figure 7:
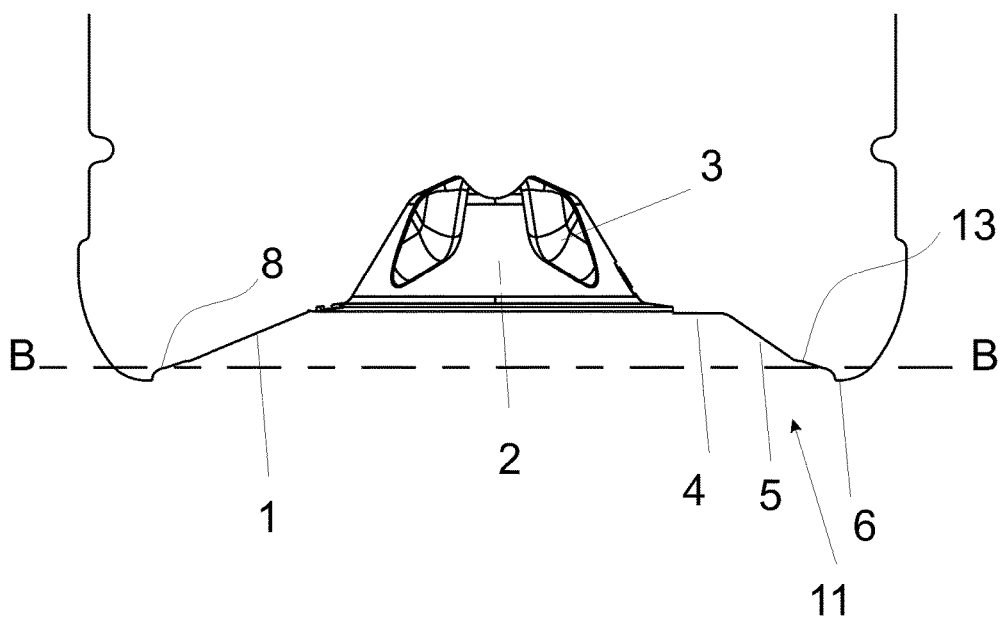
FIG. 7: shows the base of FIG. 2 following collapsing.
Figure 6A:
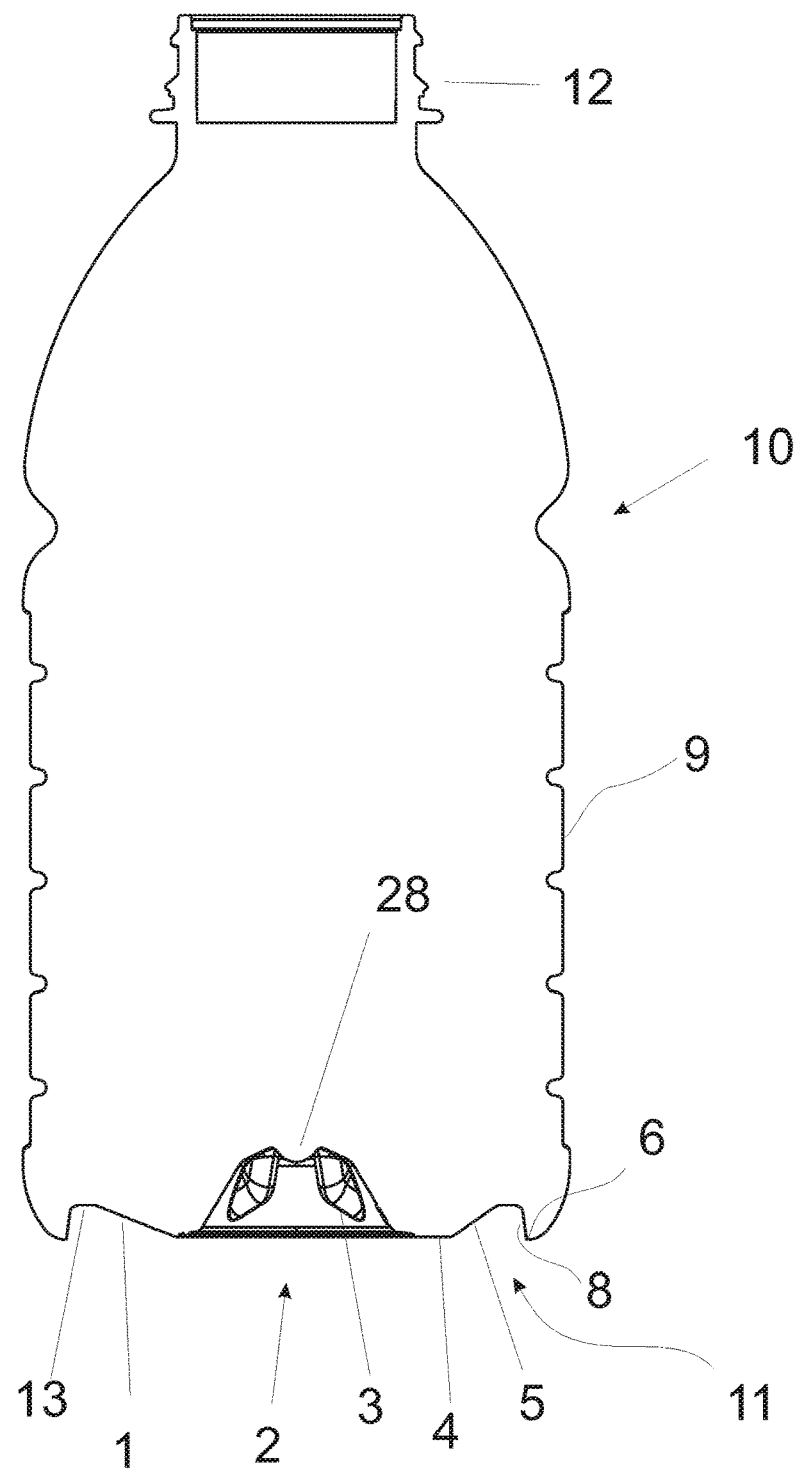
FIG. 6A: shows a cross sectional view of an alternative container configuration.

Referring to FIGS. 6 and 7, it will be appreciated that the control portion 5 may be initially set to be outwardly inclined by approximately 35 degrees, or about 125 degrees relative to the longitudinal axis, and will then provide an inversion and angle change of approximately 70 degrees. The initiator portion may in this example be 20 degrees. As a further example referring to FIG. 6A, the base 2 may be recessed to such an extent that the entire lower sidewall portion and base are substantially or completely contained horizontally above the standing ring 6 even prior to folding of the pressure panel 11. Preferably the pressure panel 11 includes a portion inclined outwardly at an angle of greater than 10 degrees relative to a plane orthogonal to a longitudinal axis of the container when the pressure panel is in the initial position, or about 100 degrees relative to the longitudinal axis, and much steeper angles such as those described herein may be used.

Figure 8A:
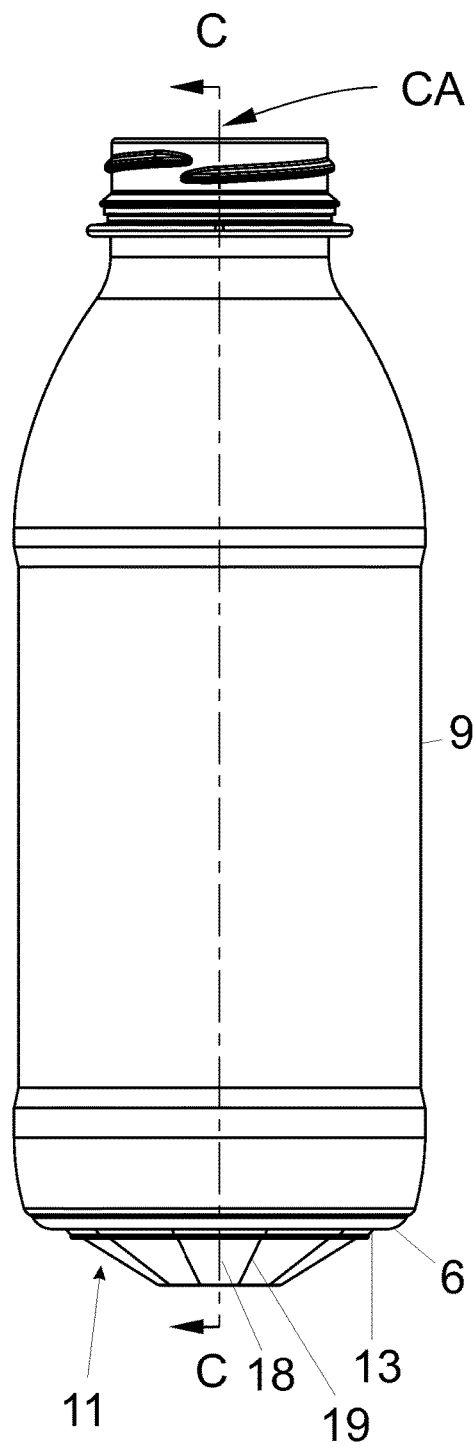
FIG. 8a: shows a cross-sectional view of a hot-fill container according to an alternative embodiment of the invention in its pre-collapsed condition.
Figure 8B:
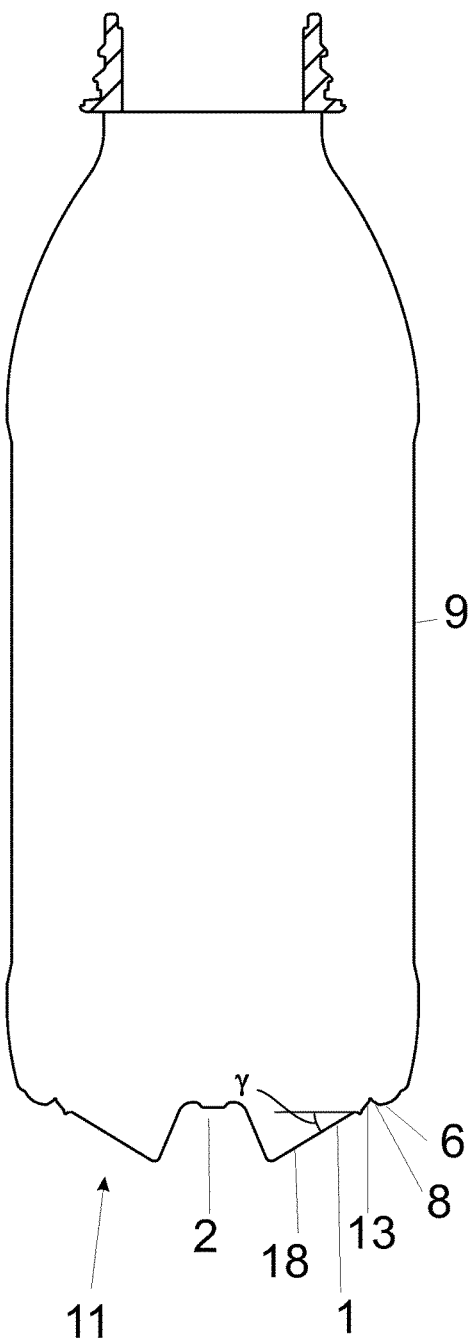
FIG. 8b: shows a side view of the container shown in FIGS. 5b and 9 through line C-C.

Referring to FIGS. 8a and 8b, where the same reference numerals have been used where appropriate as previously, it is envisaged that in possible embodiments of this invention the initiator portion may be reconfigured so that pressure panel 11 would provide essentially a continuous conical area about the base 2.

Figures 19A, 19B:
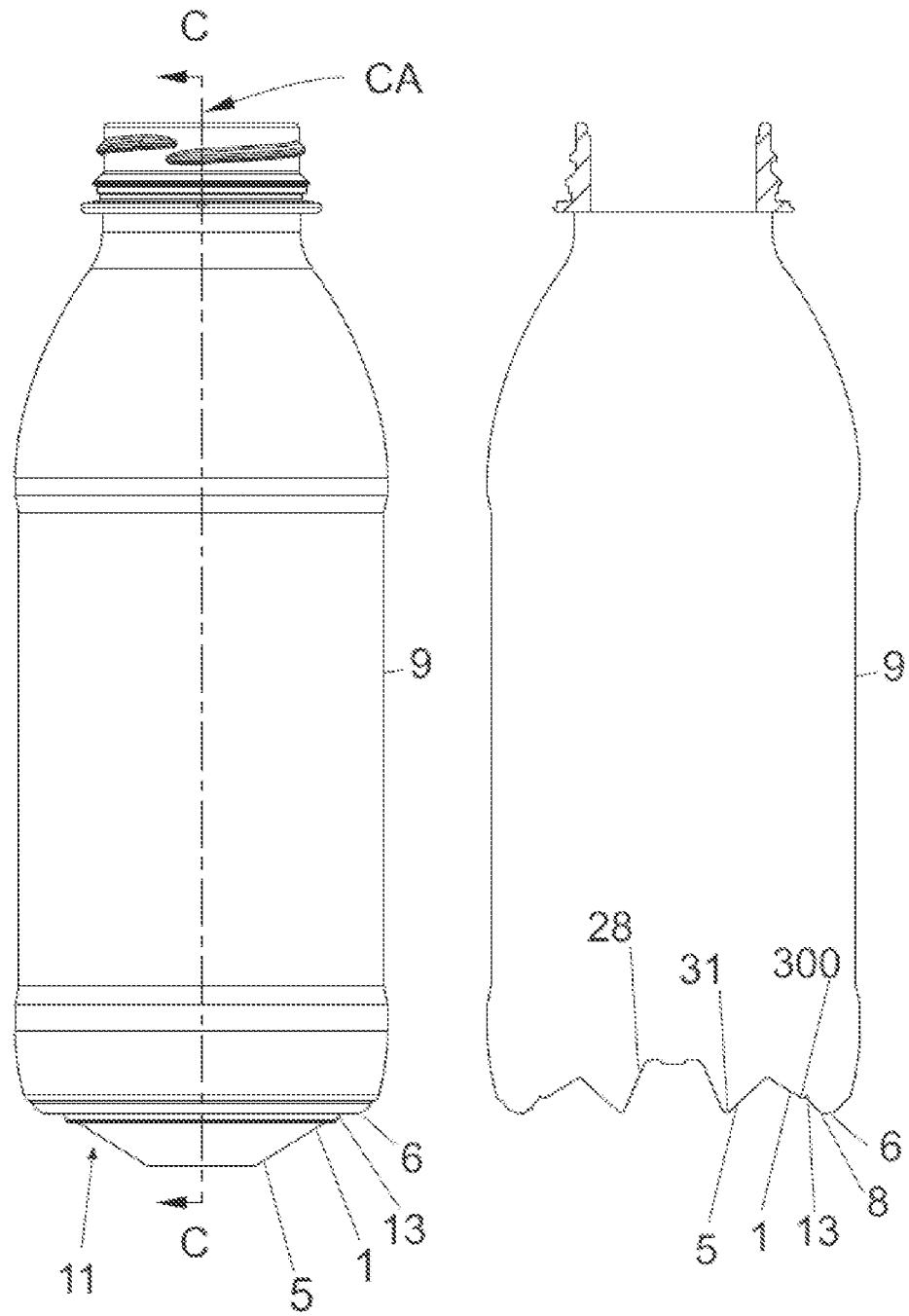
FIG. 19a: shows a side view of a hot-filled container of an alternative embodiment in its pre-collapsed condition.
FIG. 19b: shows a cross-sectional view of the container of FIG. 19a through the line see-C.

The initiator portion 1 and the control portion 5 of the embodiment of the preceding figures will now be at a common angle, such that they form a uniformly inclined panel portion. However, initiator portion 1 may still be configured to provide the area of least resistance to inversion, such that although it shares the same angular extent as the control portion 5, it still provides an initial area of collapse or inversion. In this embodiment, initiator portion 1 causes the pressure panel 11 to begin inversion from the widest diameter (i.e., wide diameter 300 of the widest portions 30) adjacent a first juncture with a region of juncture providing the decoupling structure 13 ahead of the narrowest diameter (i.e., narrow diameter of the narrowest portions 31) adjacent a second juncture with the centrally located push-up portion 28. Such an arrangement is shown in FIGS. 19a and 19b.

Figure 17A:
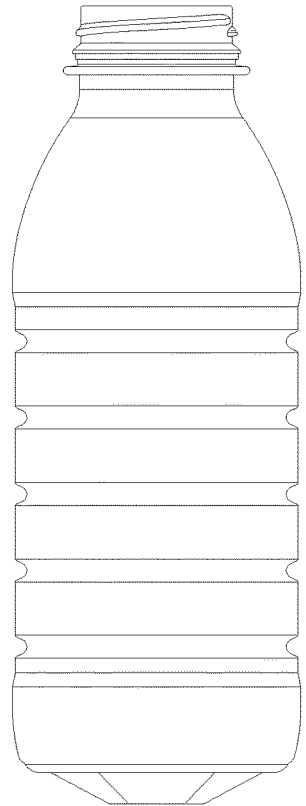
FIGS. 17a-d: show side, side perspective, end perspective and end views respectively of the container of FIG. 15.
Figure 17B:
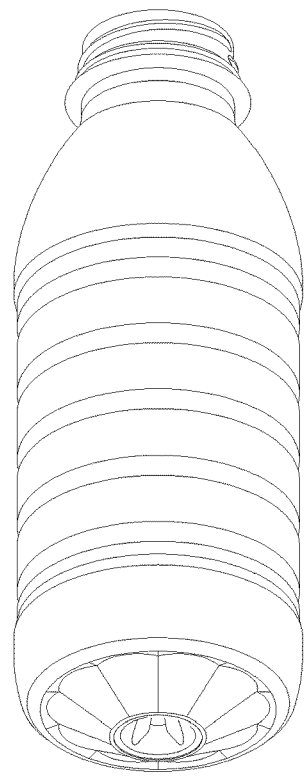
Figure 17C:
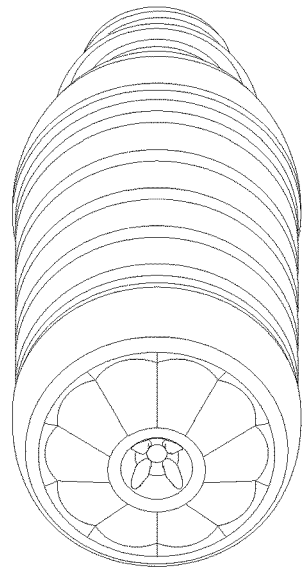
Figure 17D:
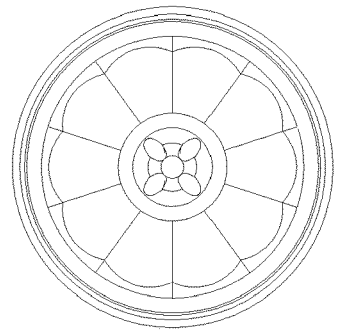
Figure 18A:
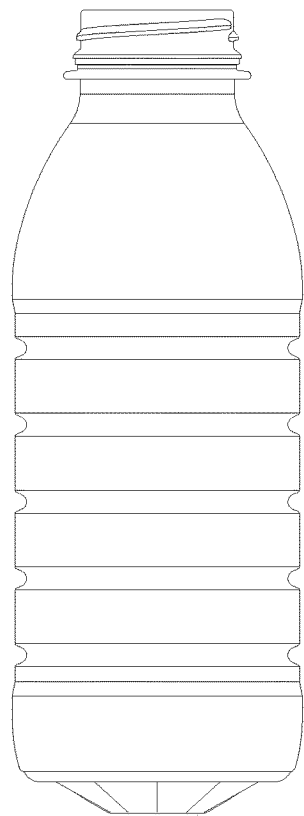
FIGS. 18a-d: show side, side perspective, end perspective and end views respectively of the container of FIG. 16.
Figure 18B:
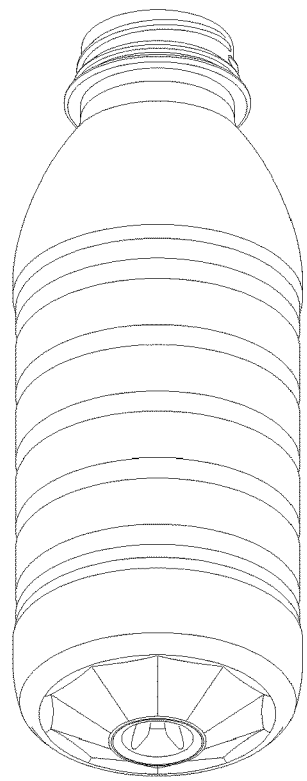
Figure 18C:
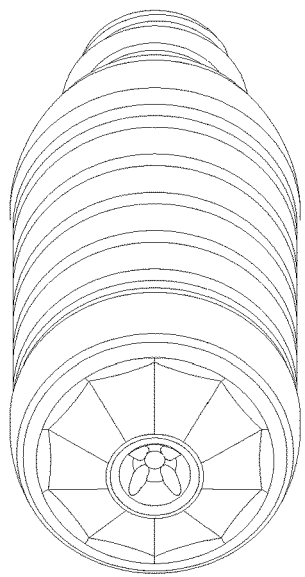
Figure 18D:
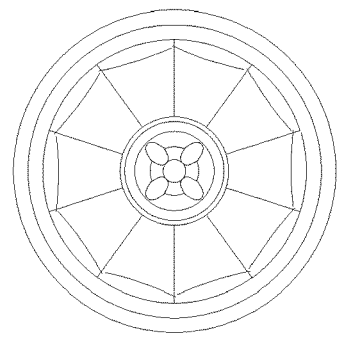

In the embodiment of FIGS. 8a and 8b the container side walls 9 are 'glass-like' in construction in that there are no additional strengthening ribs or panels as might be typically found in a container, particularly if required to withstand the forces of vacuum pressure. A container side wall can be less glass like, such as is shown in FIGS. 1 and 17a, and may include the structures shown therein, such as ribs or panels if desired, or other structures. Additionally, however, structures may be added to the conical portions of the vacuum panel 11 in order to add further control over the inversion process. For example, the conical portion of the vacuum panel 11 may be divided into fluted regions. Referring to FIGS. 8a and 9 especially, panel portions that are convex outwardly, and evenly distributed around the central axis create regions of greater angular set 19 (δ) and regions of lesser angular set 18 (γ), may provide for greater control over inversion of the panel. Such geometry provides increased resistance to reversion of the panel, and a more even distribution of forces when in the inverted position.

Referring to FIGS. 15a-c and 17a-d, convex or downwardly outwardly projecting flutes are shown.

Concave or inwardly directed fluting arrangements are also envisioned, in addition to outwardly directed flutes. Inwardly directed flutes offer less resistance to initial inverting forces, coupled with increased resistance to reverting back out to the original position. In this way they behave in much the same manner as ribs to prevent the panel being forced back out to the outwardly inclined position, but allow for hinge movement from the first outwardly inclined position to the inwardly inclined position. Such inwardly or outwardly directed flutes or projections function as ribs to increase the force required to invert the panel. It will be appreciated that the mechanical action applied to invert the panel will be sufficient to overcome any rib-strengthened panel, and when the mechanical action is removed the rib-strengthened panel, for example by strong flutes, will be very resistant to reversion to the original position if the container is dropped or shocked.

Figure 16A:
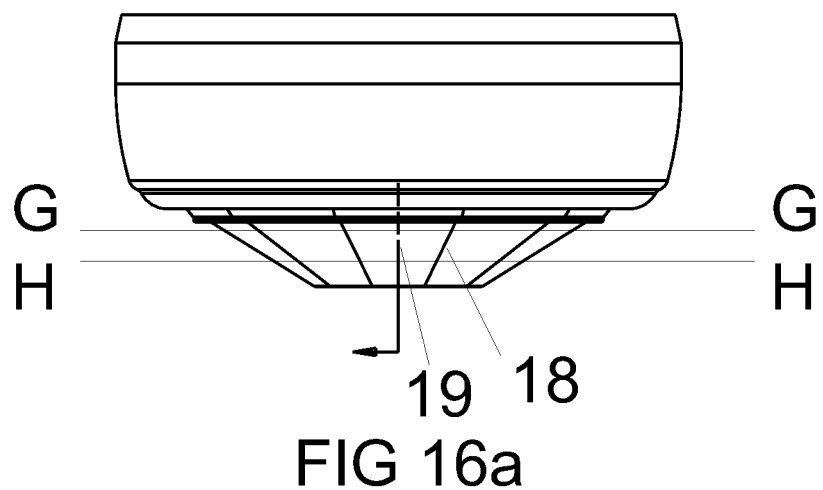
FIG. 16a: shows a side view of a container of FIG. 16c according to an alternative embodiment including inwardly projecting fluting through Line I-I.
Figure 16B:
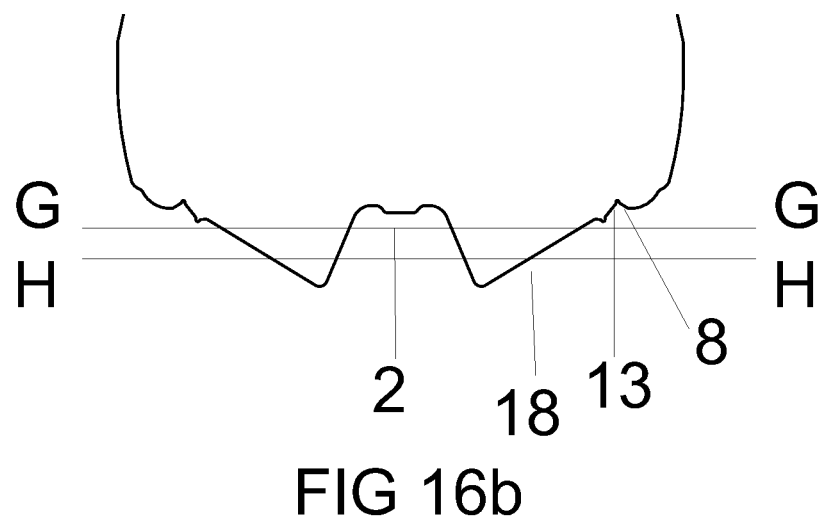
FIG. 16b: shows a cross-sectional view of the base of the container of FIG. 16c through Line J-J.
Figure 16C:
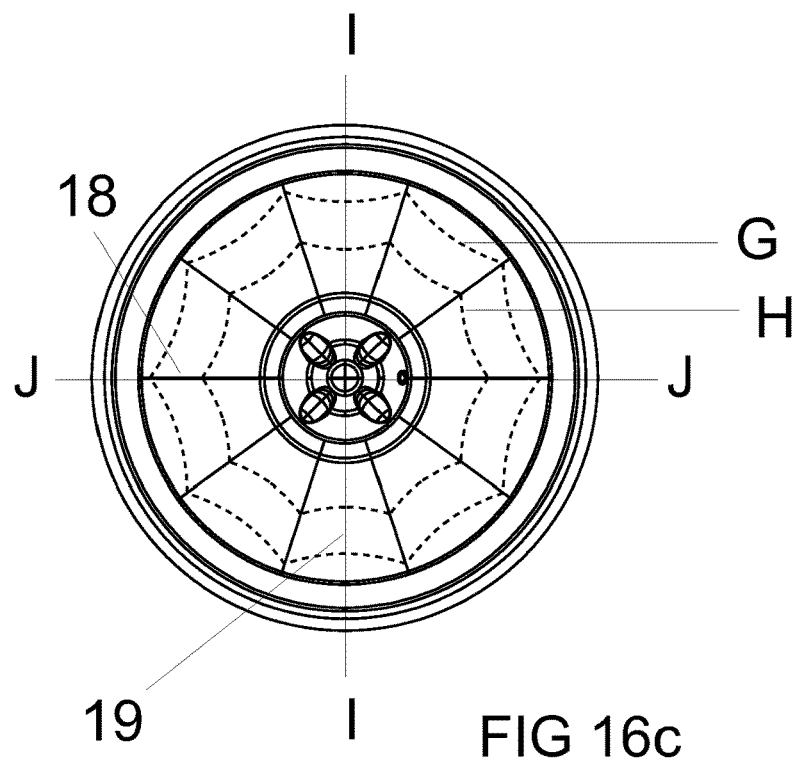
FIG. 16c: shows an underneath view of the base of the container of FIGS. 16a and 16b with dotted contour section lines through lines G-G and H-H.
Figure 16D:
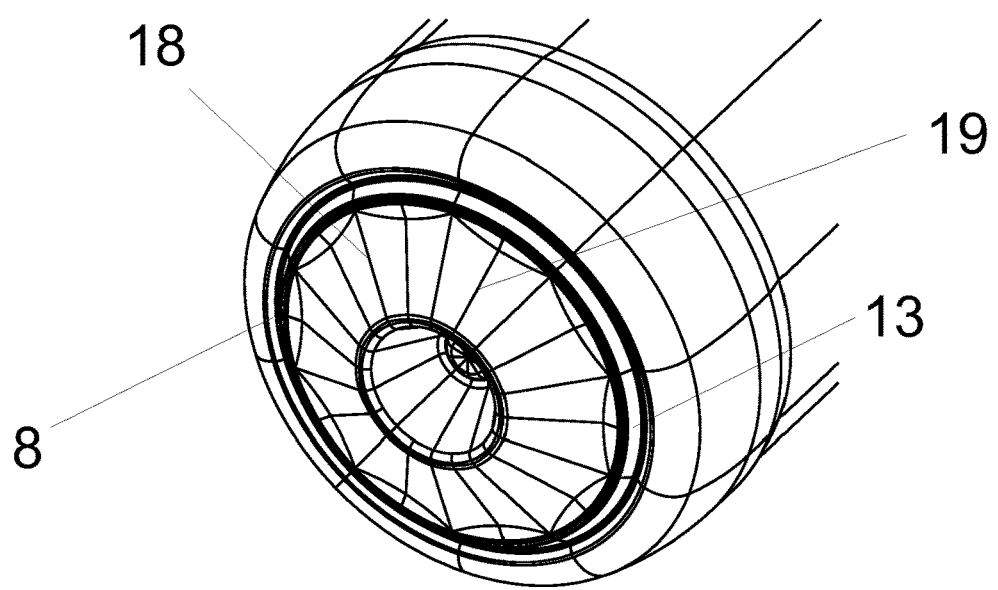
FIG. 16d: shows a perspective view of the base of the container of FIGS. 16a-c.

Referring to FIGS. 16a-d and 18a-d concave or upwardly inwardly projecting flutes are shown, the contour lines G and H of FIG. 16c illustrating this concavity through two cross-sectional reliefs.

Further embodiments comprising arrays utilizing both concave and convex flutes are also intended within the scope of the invention.

Figures 11A, 11B, 11C, 11D:
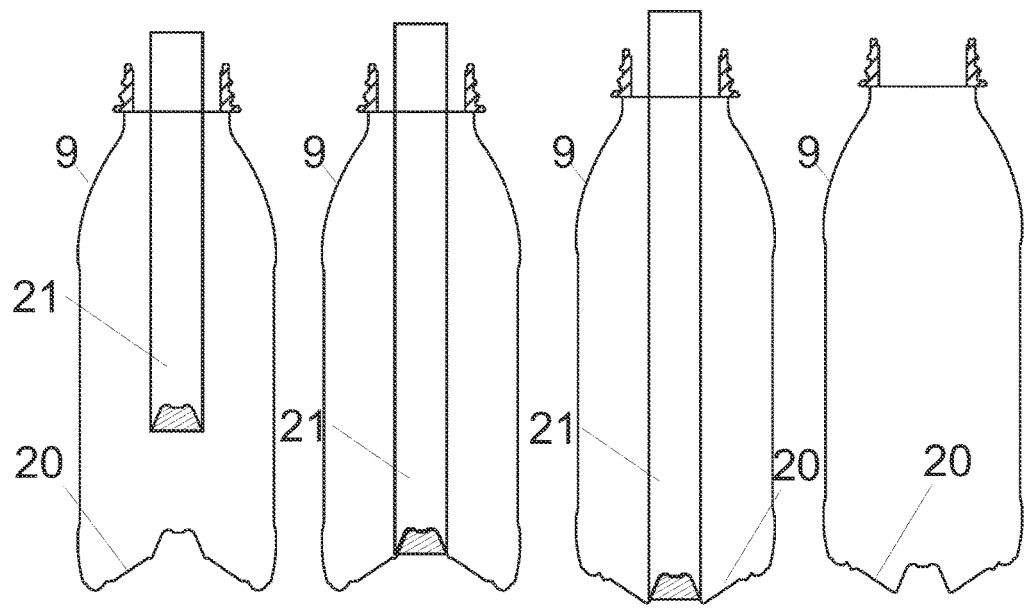
FIGS. 11a-d: show cross-sectional views of the container according to an alternative embodiment of the invention incorporating a pusher to provide panel folding
Figures 12A, 12B, 12C, 12D:
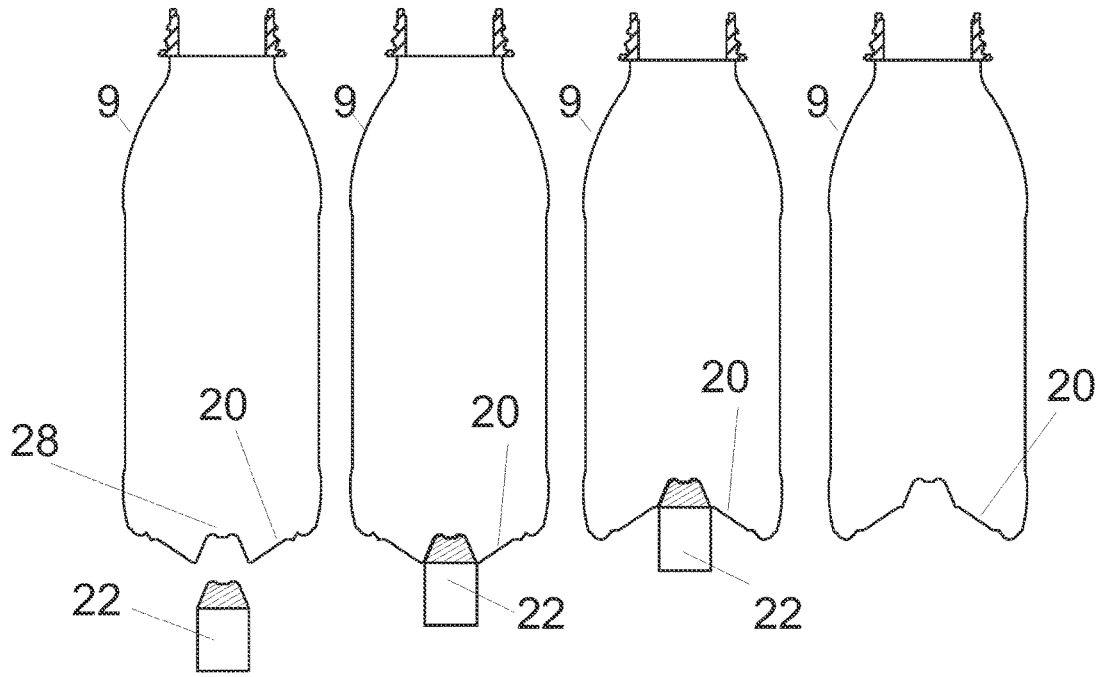
FIGS. 12a-d: show cross-sectional views of the container according to a further alternative embodiment of the invention incorporating a pusher to provide panel folding

In the embodiment as shown in FIGS. 11a-d the container may be blow moulded with the pressure panel 20 in the inwardly or upwardly inclined position. A force could be imposed on the folding panel 20 such as by means of a mechanical pusher 21 introduced through the neck region and forced downwardly in order to place the panel in the outwardly inclined position prior to use as a vacuum container for example, as shown in FIG. 11d.

In such an embodiment as shown in FIGS. 12a-d, following the filling and capping of the bottle and the use of cold water spray creating the vacuum within the filled bottle, a force, for example by way of repositioning means, could be imposed on the folding panel 20 such as by means of a mechanical pusher 22, received by a centrally located push-up portion 28 in the panel, or the creation of some relative movement of the bottle base relative to a punch or the like, in order to force the panel 20 from an outwardly inclined position to an inwardly inclined position. Any deformation whereby the bottle shape was distorted prior to inversion of the panel 20 would be removed as internal volume is forcibly reduced. The vacuum within the container is removed as the inversion of the panel 20 causes a rise in pressure. Such a rise in pressure reduces vacuum pressure until ambient pressure is reached or even a slightly positive pressure is achieved.

It will be appreciated that in a further embodiment of the invention the panel may be inverted in the manner shown in FIGS. 12a-d in order to provide a panel to accommodate internal force such as is found in pasteurization and the like. In such a way the panel will provide relief against the internal pressure generated and then be capable of accommodating the resulting vacuum force generated when the product cools down.

In this way, the panel will be inverted from an upwardly inclined position FIGS. 11a to 11b to a downwardly inclined position as shown in FIGS. 12a-d, except that the mechanical action is not provided. The force is instead provided by the internal pressure of the contents.

Referring again to FIGS. 12a-d it will be seen that by the provision of the folding portion 20 in the bottom of the side wall 9 of the container 10 the major portion of the side wall 9 could be absent any structural features so that the container 10 could essentially replicate a glass container if this was required.

Although particular structures for the bottom portion of the side wall 9 are shown in the accompanying drawings it will be appreciated that alternative structures could be provided. For example a plurality of folding portions could be incorporated about the base 2 in an alternative embodiment.

There may also be provided many different decoupling or hinge structures 13 without departing from the scope of the invention. With particular reference to FIGS. 6 and 7, it can be seen that the side of the decoupling structure 13 that is provided for the pressure panel 11 may be of an enlarged area to provide for increased longitudinal movement upwards into the container following inversion.

Figure 13:
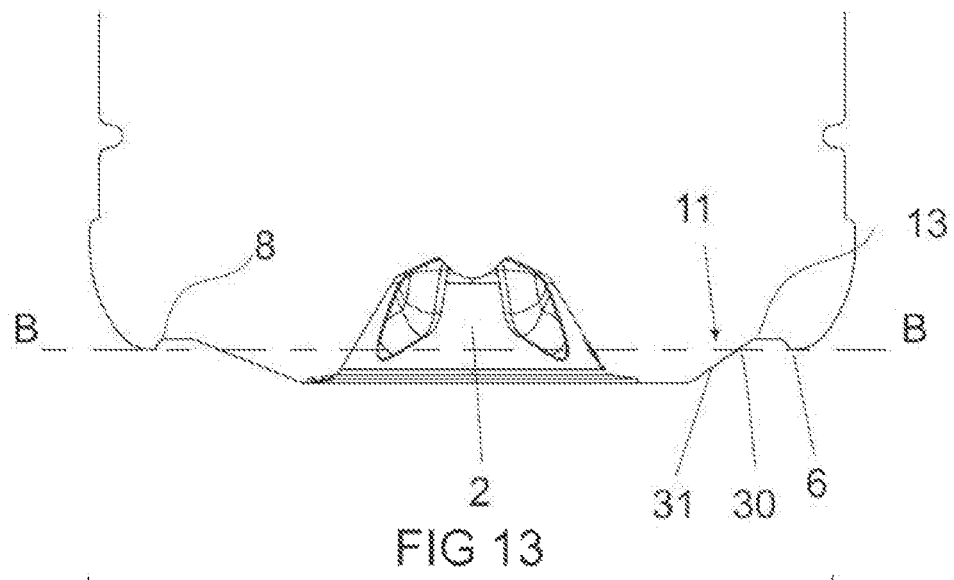
FIG. 13: shows the base of an alternative embodiment of the invention before collapsing.
Figure 14:
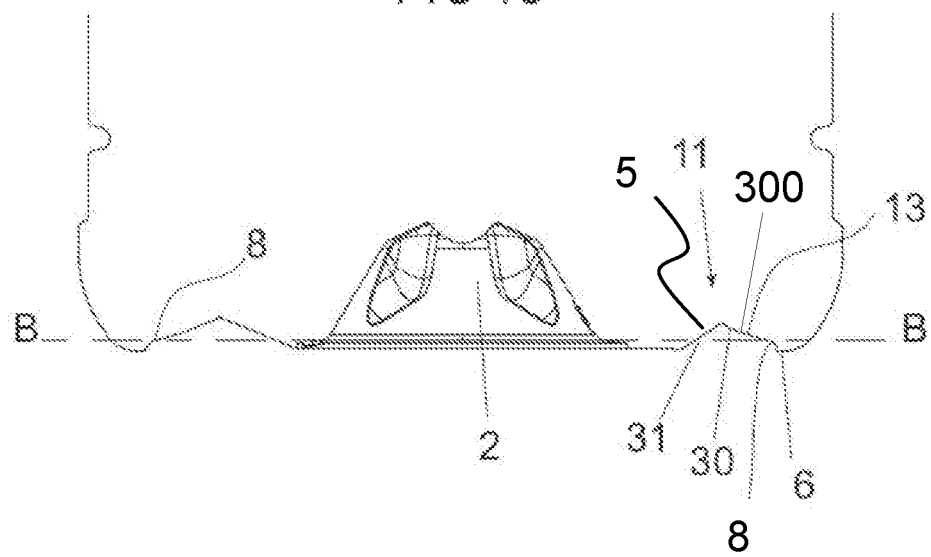
FIG. 14: shows the base of FIG. 13 during the initial stages of collapsing.
Figure 15A:
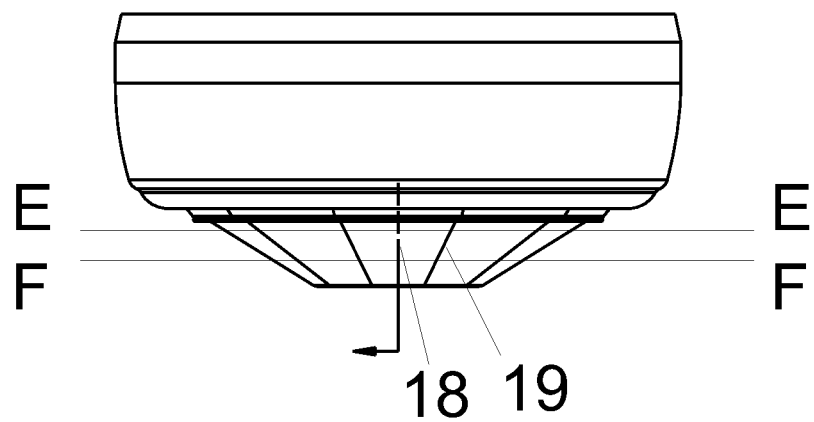
FIGS. 15a-b: show side and cross-sectional views of the container shown in FIG. 9 including outwardly projecting fluting
Figure 15B:
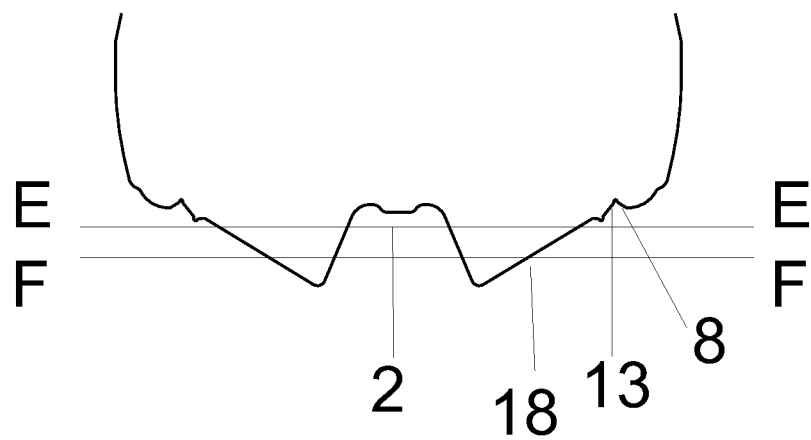
Figure 15C:
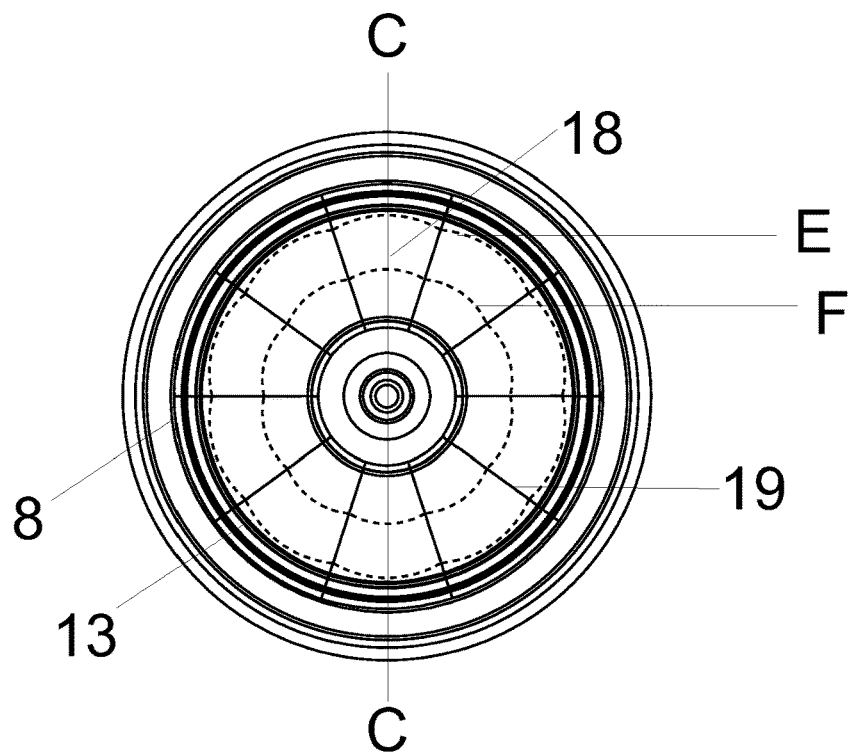
FIG. 15c: shows an underneath view of the base of the container of FIGS. 15a and 15b with dotted contour section lines through lines E-E and F-F.
Figure 15D:
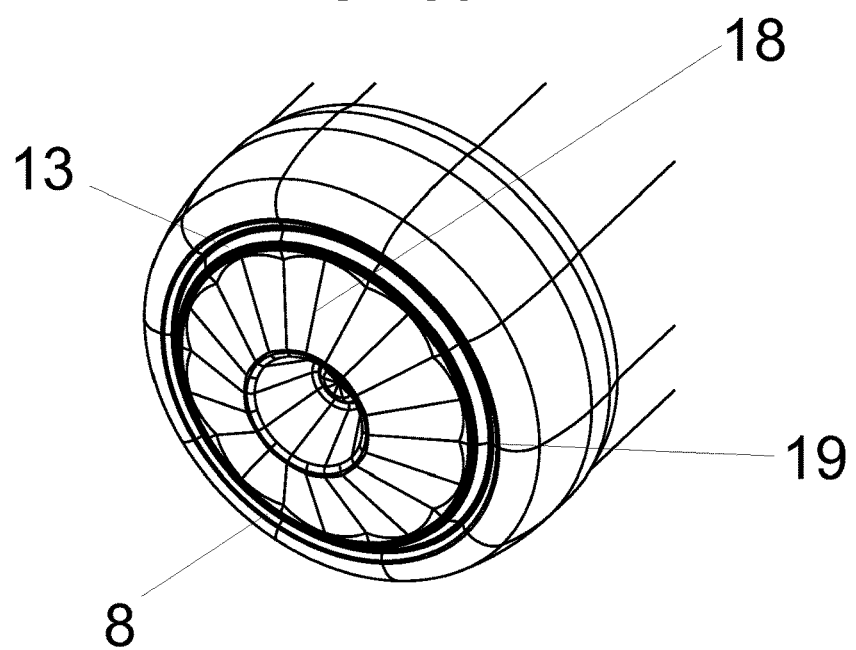
FIG. 15d: shows a perspective view of the base of the container of FIGS. 15a-c.

In a further embodiment of the present invention, and referring to FIGS. 13 and 14, it can be seen that the widest diameter (i.e., wide diameter 300 of the widest portions 30)

of the pressure panel 11 adjacent a first juncture with the region of juncture providing a hinge element may invert earlier than the narrowest diameter (i.e., narrow diameter of the narrowest portions 31) adjacent a second juncture with the centrally located push-up portion 28. The initiator portion may be constructed with this in mind, to allow for thinner material and so on, to provide for the panel 11 to begin inverting where it has the greater diameter, ahead of the narrower sections of the panel. In this case the portion 30 of the panel, which is radially set more distant from the central axis of the container inverts ahead of portion 31 to act as the initiator portion.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

What is claimed is:

1. A system for handling plastic containers, each said container having a longitudinal axis, an upper portion having an opening into the container, a body portion extending from the upper portion to a lower portion, the lower portion including a base, the base closing off an end of the container and including a standing surface, the container having at least one substantially transversely oriented pressure panel located in the lower portion, an instep recessed from the standing surface to a region of juncture circumscribing the pressure panel, the pressure panel comprising a control portion being inclined downwardly at an angle of more than 100 degrees relative to a plane parallel to the longitudinal axis and the opening into the container, the pressure panel comprising a centrally located push-up portion, the pressure panel comprising a wide diameter adjacent a first juncture with the region of juncture and a narrow diameter, closer to the longitudinal axis than the wide diameter, adjacent a second juncture with the centrally located push-up portion, the centrally located push-up portion being further recessed upwardly relative to the narrow diameter, the pressure panel to be repositioned about the region of juncture, the system comprising:

hot filling means for filling the containers with the pressure panel in a first position with a hot or heated product, the product being at an elevated temperature;
    sealing means for sealing the filled containers using a cap;
    vacuum creating means for creating a vacuum in each of the filled and sealed containers by cooling;
    repositioning means to position a mechanical rod or punch-like device for repositioning the pressure panel from the first position to a second position toward the opening into the container to reduce the vacuum, wherein the mechanical rod or punch-like device is configured to engage the centrally located push-up portion closer to the longitudinal axis than the narrow diameter and above a height of the second juncture to reposition the pressure panel from the first position to the second position, and wherein, in the second position: at least a portion of the pressure panel is inclined upwardly relative to the plane parallel to the longitudinal axis and the opening of the container; and, the recessed instep is in an upward position.

2. The system of claim 1, wherein the instep is recessed into the container from the standing surface to such an extent that the entire pressure panel is contained above the standing surface when in the first position, and the pressure panel is connected to the instep by a hinge element provided on the region of juncture.

3. The system of claim 2, comprising means for providing the containers to the hot filling means, the sealing means, the vacuum creating means and the repositioning means and the container is transferred on the standing surface.

4. The system of claim 2, wherein the pressure panel includes a plurality of indentations or flutes to facilitate repositioning thereof, the indentations or flutes being adapted to flex during repositioning of the pressure panel.

5. The system of claim 1, wherein the instep is in an upward position when the pressure panel is in the first position and remains substantially in the same position when the pressure panel is in both the first and second positions.

6. The system of claim 1, wherein the container body includes a portion that is rigidified against vacuum pressure deformation.

7. The system of claim 1, wherein the container body includes a portion that deforms inwardly and reduces a portion of the vacuum pressure created during the cooling of the container.

8. The system of claim 7, wherein repositioning the pressure panel reduces a portion of the vacuum pressure.

9. The system of claim 1, comprising means for providing the containers to the hot filling means, the sealing means, the vacuum creating means and the repositioning means.

10. A system for handling filled plastic containers, each said container including a longitudinal axis and a pressure panel located substantially transversely to the longitudinal axis, wherein the container includes an instep adjacent to an inside border of a standing support, wherein the pressure panel is connected to a hinge element circumscribing a wide diameter of the pressure panel; wherein the pressure panel further comprises a first portion being outwardly inclined at an angle of between about 100 to 135 degrees relative to a plane parallel to the longitudinal axis and a second portion being angled at a lesser angle than the first portion, wherein the pressure panel further comprises a narrow diameter circumscribing a centrally located push-up portion to move in response to a longitudinally directed force, the system comprising:

filling means for filling the container with a product, the product being at an elevated temperature;
    sealing means for sealing the filled container using a cap;
    vacuum creating means for creating a vacuum in the filled and sealed container by cooling; and
    repositioning means comprising a mechanical pusher or the like to be located within the centrally located push-up portion closer to the longitudinal axis than the narrow diameter and above a height of the height of the narrow diameter for repositioning the pressure panel of the container from a first position to a second position to reduce at least a portion of the vacuum, and wherein, in the second position, at least a portion of the pressure panel is inclined upwardly relative to the plane parallel to the longitudinal axis, wherein the pressure panel is repositioned about the instep by the hinge element and the instep is an upward position when the pressure panel is in the second position.

11. The system of claim 10, wherein the instep is in an upward position when the pressure panel is in the first position and is recessed to such an extent that the pressure panel is contained entirely above the standing support.

12. The system of claim 10, wherein a body portion of the container further includes at least a portion of a sidewall configured to deform under vacuum forces generated within the container during cooling of the heated liquid prior to the step of repositioning the pressure panel from the first position to the second position.

13. The system of claim 11, wherein the pressure panel includes a plurality of indentations or flutes to facilitate repositioning thereof, the indentations or flutes being adapted to flex during repositioning of the pressure panel.

14. The system of claim 11, further comprising a means for transporting the container from said vacuum creating means to said repositioning means.

15. The system of claim 12, wherein the body portion of the container further includes one or more indentations, the one or more indentations providing structural integrity for the plastic bottle.

16. The system of claim 10, wherein the pressure panel includes a plurality of indentations or flutes to facilitate repositioning thereof, the indentations or flutes being adapted to flex during repositioning of the pressure panel.

17. The system of claim 10, further comprising a means for transporting the container from said vacuum creating means to said repositioning means.

\* \* \* \* \*